United States Patent
Loe et al.

(10) Patent No.: US 11,557,775 B2
(45) Date of Patent: Jan. 17, 2023

(54) APPARATUS INCLUDING ELECTROCHEMICAL DEVICES AND HEAT EXCHANGER

(71) Applicants: SAINT-GOBAIN CERAMICS & PLASTICS, INC., Worcester, MA (US); FRAUNHOFER-GESELLSCHAFT ZUR FOERDERUNG DER ANGEWANDTEN FORSCHUNG E. V., Munich (DE)

(72) Inventors: Claire Loe, Cambridge, MA (US); Yuto Takagi, Natick, MA (US); Brian P. Feldman, Northborough, MA (US); John D. Pietras, Sutton, MA (US); Stefan Megel, Dresden (DE); Jens Schnetter, Dresden (DE); Mihails Kusnezoff, Dresden (DE)

(73) Assignees: SAINT-GOBAIN CERAMICS & PLASTICS, INC., Worcester, MA (US); FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 98 days.

(21) Appl. No.: 17/127,387

(22) Filed: Dec. 18, 2020

(65) Prior Publication Data

US 2021/0194021 A1  Jun. 24, 2021

Related U.S. Application Data

(60) Provisional application No. 62/951,959, filed on Dec. 20, 2019.

(51) Int. Cl.
*H01M 8/04014* (2016.01)
*H01M 8/2465* (2016.01)
*H01M 8/12* (2016.01)

(52) U.S. Cl.
CPC ..... *H01M 8/04014* (2013.01); *H01M 8/2465* (2013.01); *H01M 8/12* (2013.01)

(58) Field of Classification Search
CPC ................................................ H01M 8/04014
See application file for complete search history.

(56) References Cited

U.S. PATENT DOCUMENTS 5,340,664 A   8/1994  Hartvigsen
5,480,738 A   1/1996  Elangovan et al.
(Continued)

FOREIGN PATENT DOCUMENTS

EP   1263075 B1   9/2008
EP   3316369 A1   5/2018
(Continued)

OTHER PUBLICATIONS

International Search Report and Written Opinion for PCT/US2019/039053, dated Oct. 18, 2019, 9 pages.
(Continued)

*Primary Examiner* — Brian R Ohara
(74) *Attorney, Agent, or Firm* — Abel Schillinger, LLP; Thomas H. Osborn

(57) ABSTRACT

An apparatus can include a housing, a plurality of electrochemical devices disposed within the housing, and a heat exchanger disposed within the housing. The heat exchanger can be faced with an oxidant-containing gas outlet surface of at least one of the plurality of electrochemical devices. The electrochemical devices can include a stack of solid oxide fuel cells, a battery, or a solid oxide electrolyzer cell.

20 Claims, 16 Drawing Sheets

(56) References Cited

U.S. PATENT DOCUMENTS

| | | |
|---|---|---|
| 6,110,612 A | 8/2000 | Walsh |
| 6,296,963 B1 | 10/2001 | Nanjo |
| 6,627,399 B1 | 9/2003 | Haltiner, Jr. |
| 7,070,874 B2 | 7/2006 | Blanchet et al. |
| 7,226,681 B2 | 6/2007 | Florence et al. |
| 7,374,834 B2 | 5/2008 | Jewulski et al. |
| 7,588,849 B2 | 9/2009 | Haltiner, Jr. et al. |
| 7,943,266 B2 | 5/2011 | Potnis et al. |
| 8,268,491 B1 | 9/2012 | Pastula et al. |
| 8,288,051 B2 | 10/2012 | Akikusa |
| 8,507,139 B2 | 8/2013 | Izawa et al. |
| 8,642,227 B2 | 2/2014 | Harrington et al. |
| 8,852,820 B2 | 10/2014 | Perry et al. |
| 9,166,240 B2 | 10/2015 | Weingaertner et al. |
| 2003/0235733 A1 | 12/2003 | Haltiner, Jr. et al. |
| 2006/0131008 A1* | 6/2006 | Ogawa ............... H01M 8/004 165/125 |
| 2006/0134476 A1 | 6/2006 | Tsunoda et al. |
| 2006/0204796 A1 | 9/2006 | Potnis |
| 2009/0148733 A1* | 6/2009 | Tsunoda ............ H01M 8/2475 429/411 |
| 2009/0202878 A1 | 8/2009 | Schild |
| 2010/0143814 A1 | 6/2010 | Harrington et al. |
| 2010/0167154 A1* | 7/2010 | Ono ............... H01M 8/04089 429/457 |
| 2012/0295182 A1 | 11/2012 | Ishioka et al. |
| 2015/0295260 A1 | 10/2015 | Yoshimine |
| 2016/0064747 A1 | 3/2016 | Tsukamoto et al. |
| 2016/0064760 A1 | 3/2016 | Akagi et al. |
| 2016/0131434 A1 | 5/2016 | Noishiki et al. |
| 2017/0092964 A1 | 3/2017 | Hickey et al. |
| 2018/0191014 A1 | 7/2018 | Son et al. |
| 2018/0331384 A1 | 11/2018 | Feldman et al. |
| 2018/0331385 A1* | 11/2018 | Hickey ............... H01M 8/0625 |
| 2019/0393522 A1 | 12/2019 | Feldman et al. |

FOREIGN PATENT DOCUMENTS

| | | |
|---|---|---|
| JP | 2007059377 A | 3/2007 |
| JP | 2008251237 A | 10/2008 |
| JP | 6114197 B2 | 4/2017 |
| JP | 6396182 B2 | 9/2018 |
| KR | 100709200 B1 | 4/2007 |
| KR | 20100083027 A | 7/2010 |
| KR | 101238892 B1 | 3/2013 |
| KR | 101275346 B1 | 6/2013 |
| KR | 20130109339 A | 10/2013 |
| KR | 20130135430 A | 12/2013 |
| KR | 101398584 B1 | 5/2014 |
| WO | 2017003138 A1 | 1/2017 |
| WO | 2017118481 A1 | 7/2017 |
| WO | 2020005987 A1 | 1/2020 |

OTHER PUBLICATIONS

International Search Report and Written Opinion for PCT/US2020/066117, dated Apr. 16, 2021, 10 pages.

Ghezel-Ayagh, Hossein "Progress in SOFC Technology Development at FuelCell Energy,", 20th Annual Solid Oxide Fuel Cell (SOFC) Project Review Meeting, Washington, DC, Apr. 30, 2019, 31 pages.

* cited by examiner

APPARATUS INCLUDING ELECTROCHEMICAL DEVICES AND HEAT EXCHANGER

CROSS-REFERENCE TO RELATED APPLICATION(S)

This application claims priority under 35 U.S.C. § 119(e) to U.S. Provisional Patent Application No. 62/951,959, filed Dec. 20, 2019, by Claire LOE et al., entitled "APPARATUS INCLUDING ELECTROCHEMICAL DEVICES AND HEAT EXCHANGER," which is assigned to the current assignees hereof and incorporated herein by reference in its entirety for all purposes.

FIELD OF THE DISCLOSURE

The following is directed to apparatus including a plurality of electrochemical devices and a heat exchanger.

DESCRIPTION OF THE RELATED ART

Solid oxide fuel cells (SOFC) are electrochemical devices that operate at high temperatures (e.g., 600° C. to 1000° C.). A hot box enclosing an SOFC stack can include insulation to maintain the fuel cells at the desired operating temperatures. The heat generated by the fuel cells is used to maintain the temperature within the hot box. However, maintaining a uniform distribution of the temperature throughout the hot zone can be challenging both because the heat may be generated non-uniformly and the incoming flows provide a cooling effect. Thus, in a well-insulated hot box, gas outlet faces can be significantly hotter than gas inlet faces, which can cause undesired thermal gradients in the fuel cell stack leading to non-uniform current distribution, local thermal stresses, and performance degradation. This issue can be magnified with state-of-the-art SOFC stacks formed with only ceramics (referred to as "all-ceramic stack" hereinafter), because components of an all-ceramic stack have relatively low thermal conductivity, e.g., at least 10 times lower, compared to those containing bulk metal components commonly used in fuel cells. Larger thermal gradients can be generated within an all-ceramic stack, which can accelerate performance degradation of the stack.

All-ceramic stacks also have advantages over metal-supported SOFC stacks and stacks having metal interconnects. For instance, all-ceramic stacks can be formed by co-sintering a plurality or an entire stack of fuel cells, which can simplify the manufacturing process and reduce associated cost. Additionally, it is possible to obtain a tight match of thermal expansion coefficients (CTEs) between components by carefully selecting suitable materials, which helps to reduce the risk of formation of cracks during firing processes or operations, induced by thermal stress due to mismatched CTEs. Metals often have much higher CTEs compared to ceramic materials used in fuel cell stacks, rendering it difficult to match the CTEs of an adjacent ceramic component to the metal component. Furthermore, at solid oxide fuel cell operation temperatures, metal surfaces tend to oxidize, which can increase the contact resistance between the metal and adjacent ceramic component, resulting in degradation of electrochemical performance of fuel cells. Using surface coatings may help to reduce oxidation of metal surfaces, but it significantly increases the manufacturing cost.

The industry continues to demand fuel cells with improved performance, stability, and efficiency.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes", "including", "has", "having," or any other variation thereof, are intended to cover a non-exclusive inclusion.

For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to an apparatus including a housing enclosing a plurality of electrochemical devices and a heat exchanger arranged to heat cool inlet gas, such as an oxidant-containing inlet gas or a fuel inlet gas, before the inlet gas is transported to the plurality of electrochemical devices. In an embodiment, the apparatus may take the form of a hotbox. Particular embodiments relate to a 2.5 kW hotbox module. The apparatus of embodiments herein can accommodate gas flow distributions for a plurality of electrochemical devices using a decreased number of piping connections and/or manifolds that can reduce structure complexity, provide a user-friendly assembly, and also decrease the risk of chromium poisoning due to reduced utilization of metal.

Figure 1:
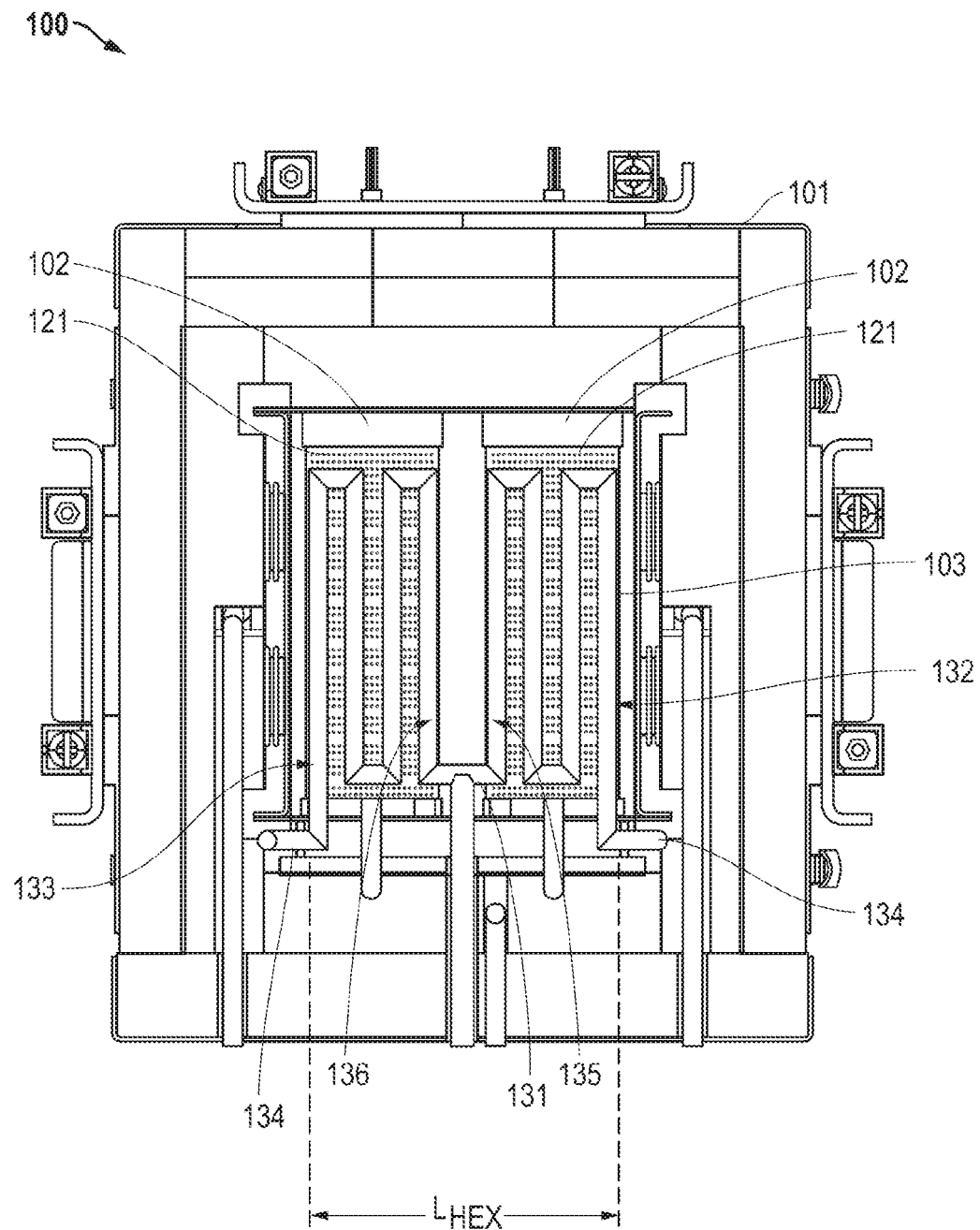
FIG. 1 includes an illustration of a cross-sectional view of an apparatus according to an embodiment.

Referring to FIG. 1, a cross-sectional view of an apparatus 100 according to an embodiment is illustrated. A plurality of electrochemical devices 102 and a heat exchanger 103 are disposed within the housing 101. The electrochemical device 102 can include a stack of solid oxide fuel cells, an electrolyzer, a hydrogen pump, an oxygen pump, a battery, or the like.

Figure 2:
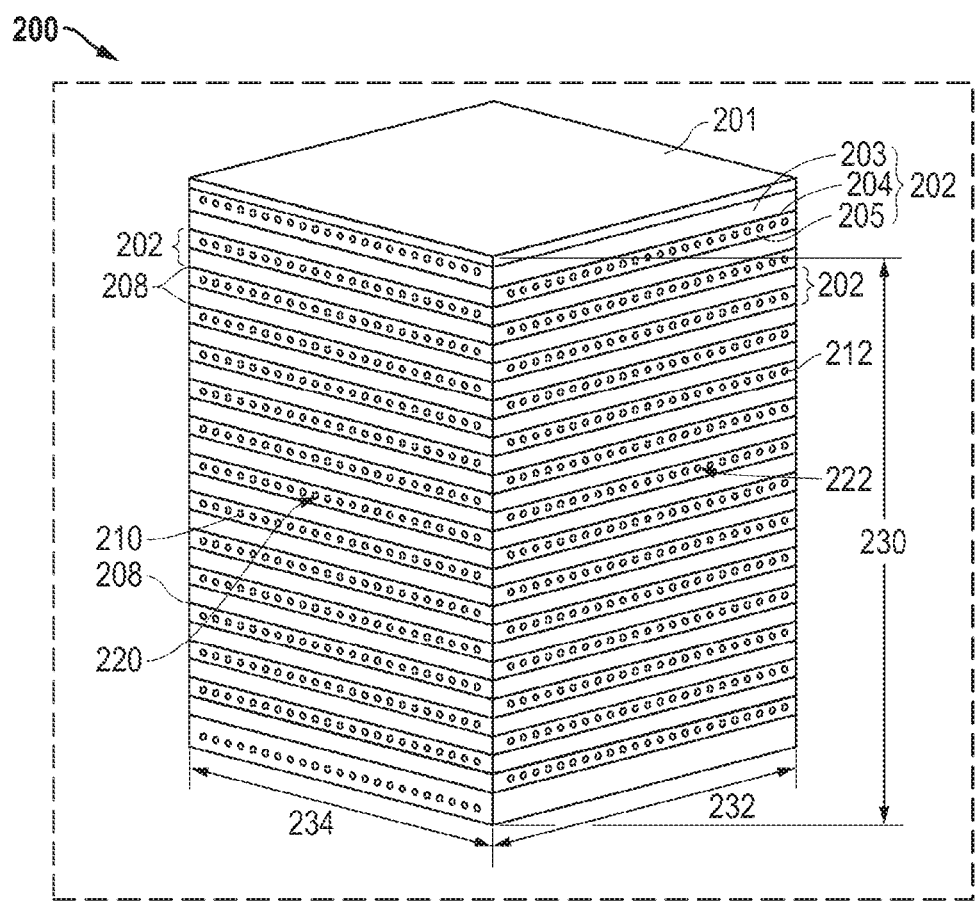
FIG. 2 includes an illustration of a perspective view of an electrochemical device according to an embodiment.

Briefly turning to FIG. 2, a perspective view of an exemplary electrochemical device, a stack of solid oxide fuel cell 200, is illustrated. The stack 200 includes a plurality of solid oxide fuel cells 202 separated by interconnect layers 208. A solid oxide fuel cell 202 can include a cathode 203, an anode 205, and an electrolyte 204 disposed between the cathode 203 and anode 205. The stack 200 can be formed utilizing suitable techniques and materials that are known in the art. In particular embodiments, the stack 200 can be formed with ceramic materials, and in more particular instances, the stack 200 can consist essentially of ceramic materials.

As further illustrated in FIG. 2, the cathode 203 and anode 205 can be porous. For instance, the cathode 203 can include gas channels extending along the length direction 232 of the solid oxide cell 202 to allow oxidant-containing gas to enter the cathode 203 via openings at one side surface of the cathode (not depicted) and exhaust to exit through openings at the opposite side surface of the cathode 203, such as openings 210. The anode 205 can also include gas channels extending in the width direction 234 of the solid oxide fuel cell 202. Fuel gas can enter the anode gas channels through openings at one side surface (not depicted) and exhaust can exit through openings at the opposite side surfaces, such as openings 212. Accordingly, the stack 200 can have a cross flow configuration. Further, the stack 200 can include an oxidant-containing gas inlet surface (not depicted) opposite an oxidant-containing gas outlet surface 220 and a fuel gas inlet surface (not depicted) opposite the fuel gas outlet surface 222. As used herein, a gas inlet surface is intended to refer to a surface that receives the gas, and a gas outlet surface is intended to refer to a surface from that exhaust generated from the gas exits. An exemplary fuel gas can include hydrogen (e.g. pure or humidified), a mixture of 50% of hydrogen and 50% of nitrogen or a humidified mixture thereof, a reformate of a mixture of $CH_4$, $CO_2$, CO, $H_2$, $H_2O$, or a hydrocarbon. An exemplary oxidant-containing gas can include an oxygen-containing gas, such as air.

The stack 200 can have a certain dimension including a height 230, length 232, and width 234. In an embodiment, the height 230 can be in a range from 180 mm to 600 mm. In another embodiment, the width 234 can be in a range from at least 60 mm to at most 300 mm. In yet another embodiment, the length 232 can be in a range from at least 60 mm to at most 300 mm or in a range from at least 60 mm to at most 280 mm. In some applications, the width 234 can be essentially the same as the length 232. A skilled artisan will appreciate any of the dimension of the stack 200 can change to suit the power requirement of specific applications.

In a further embodiment, a coating may be applied to at least certain surface areas to help reduce gas leakage from a component of the stack 200, such as cathode 203 or anode 205. In an exemplary application, the coating can include a glass material or a ceramic material. For instance, the coating can include BaO, $Al_2O_3$, $SiO_2$, or any combination thereof. As further illustrated in FIG. 2, a current collector 201 can be disposed on the stack 200.

In an embodiment, the plurality of electrochemical devices 102 can be adapted to operate at a relatively high temperature, such as in a range including at least 500° C. and at most 1000° C. For instance, the operation temperature can be at least 650° C. or at least 750° C. or at least 800° C.

Turning to FIG. 1, the heat exchanger 103 can be arranged to face the surfaces 121 of the electrochemical devices 102. In an embodiment, at least one of the surfaces 121 can be a gas outlet surface. In a particular embodiment, at least one of the surfaces 121 can be an oxidant-containing gas outlet surface, such as the surface 220 illustrated in FIG. 2. In a more particular embodiment, the surfaces 121 are both oxidant-containing gas outlet surface. In another embodiment, the surfaces 121 can be fuel gas outlet surfaces, such as the surface 222 illustrated in FIG. 2.

The heat exchanger 103 can include a gas inlet portion 131 that receives cool inlet gas, such as fuel gas or oxidant-containing gas having a temperature lower than a temperature of the electrochemical devices 102 and at least one gas outlet portion. In an embodiment, the inlet gas entering the inlet portion 131 can have a temperature at least 50° C. less than the temperature of the surfaces 121. For instance, the inlet gas temperature can be at least 100° C. or at least 150° C. or at least 200° C. or at least 250° C. or at least 300° C. or at least 350° C. less than the temperature of the surfaces 121.

In the illustrated embodiment, the heat exchanger 103 includes a first gas outlet portion 132 and a second gas outlet portion 133 from that the heated inlet gas can exit the heat exchanger 103. The heated inlet gas can be transported to the gas inlet surfaces of the electrochemical devices 102 through one or more pipes 134 that are directly or indirectly connected to the heat exchanger gas outlet portions 132 and 133, respectively.

In a further embodiment, the heated inlet gas can be received by electrochemical devices 102 at gas inlet surfaces opposite the surfaces 121 via gas channel openings. Exhaust generated by electrochemical reactions that take place in the electrochemical devices 102 can exit the surfaces 121. Heat coming from the electrochemical devices 102 and their exhaust can be utilized by the heat exchanger 103 to continue to heat inlet gas. In an embodiment, heat can be transferred to the heat exchanger 103 via radiation and convection.

As illustrated in FIG. 1, the heat exchanger 103 can be disposed in parallel with and spaced apart from the surfaces 121. The heat exchanger 103 can include a first branch 135 and a second branch 136 extending in opposite directions and in a serpentine shape. The heat exchanger 103 can further include a total length $L_{HEX}$ extending between the gas outlet portions 132 and 133 in the direction of the length or the width of the electrochemical devices 102, such as the length 234 or the width 232 illustrated in FIG. 2.

Figure 3:
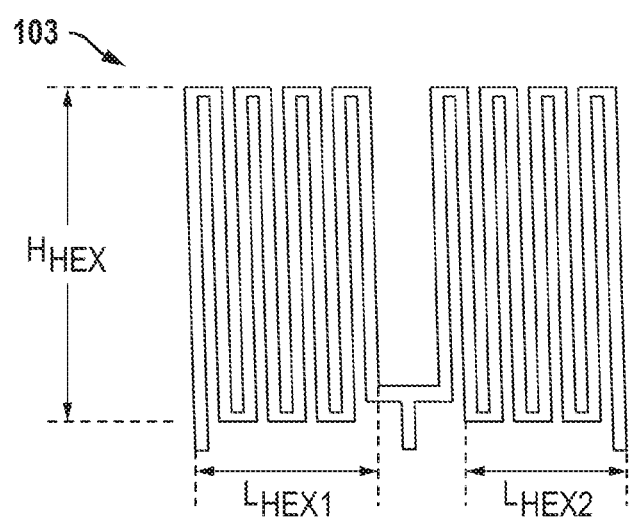
FIG. 3 includes an illustration of a heat exchanger according to an embodiment.

Referring to FIG. 3, the heat exchanger 103 can have a height $H_{HEX}$, a first length $L_{HEX1}$ and a second length $L_{HEX2}$. In an embodiment, the height $H_{HEX}$ may be less than the height of the electrochemical devices 102, such as the height 230. The length $L_{HEX1}$ and $L_{HEX2}$ may be similar to or less than the length or width of the electrochemical devices 102. In another embodiment, the area $A_{HEX}$ defined by the height $H_{HEX}$ and the length $L_{HEX1}$ ($A_{HEX}=H_{HEX} \times L_{HEX1}$) or the height $H_{HEX}$ and the length $L_{HEX2}$ ($A_{HEX}=H_{HEX} \times L_{HEX2}$) can be at least 25% of the surface area of the surface 121, such as at least 40%, at least 50%, at least 60%, or at least 75% of the surface area of the surface 121. In another instance, the arear $A_{HEX}$ may be at most 95% or at most 90% of the surface area of the surface 121.

As illustrated in FIG. 1, portions close to the top and bottom of the surfaces 121 are not faced with the heat exchanger 103. In an embodiment, the heat exchanger 103 can be positioned such that the area $A_{HEX}$ are directly faced with an area of the surface 121 that is between 10% and 90% of the height of the electrochemical devices 102, such as between 20% to 90% or between 20% to 80% or between 20% to 70% of the height of the electrochemical devices 102.

In another embodiment, the height $H_{HEX}$ of the heat exchanger 103 can be essentially the same or greater than the height of the electrochemical devices 102. For instance, the height $H_{HEX}$ can be at least 100% of the height of the device 102, at least 110%, or at least 120% of the height of the electrochemical devices 102. In another instance, the height $H_{HEX}$ may be at most 150% of the height of the electrochemical devices 102.

In an embodiment, the heat exchanger 103 can be arranged such that exhaust exiting the surfaces 121 can directly impinge on the heat exchanger 103 to facilitate improved heat transfer efficiency. In another embodiment, the inlet portions 135 and 136 can be faced with the hottest portions of the electrochemical devices 102. A skilled artisan will appreciate a temperature gradient can be present in the electrochemical devices. In applications that the electrochemical devices include stacks of solid oxide fuel cells 200, the hottest areas can be the corners formed by the oxidant-containing gas outlet surfaces and fuel gas outlet surfaces. The heat exchanger 103 can be positioned such that the inlet portions 135 and 136 can be as close as possible to those corners. Accordingly, the inlet portions 135 and 136 can be distal to cooler areas of the electrochemical devices, such as the corners formed by oxidant-containing gas inlet surfaces and fuel gas inlet surfaces of stacks 200. The outlet portions 132 and 133 can be adjacent to cooler areas and distal to hotter areas of the electrochemical devices 102. In yet another embodiment, the heat exchanger 103 can be positioned such that the hottest area of the electrochemical devices can be directly faced with the inlet portions 135 and 136 and such that exhaust can directly impinge on the inlet portions 135 and 136.

Figures 4, 5:
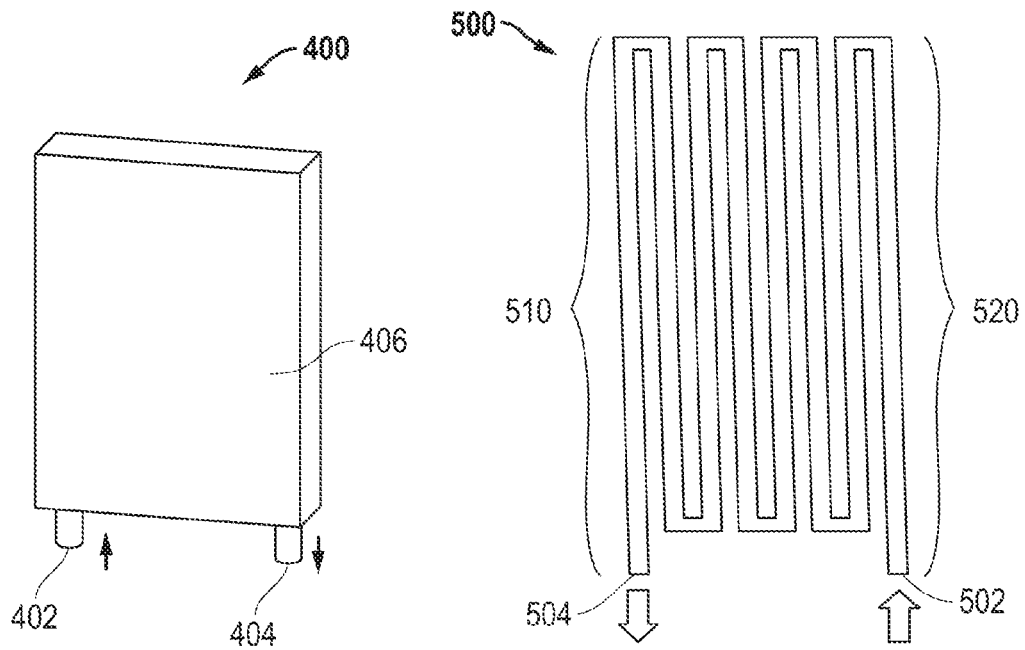
FIGS. 4 to 10 include illustrations of exemplary heat exchanger according to embodiments herein.

FIGS. 4 to 8 include further illustrations of exemplary heat exchangers that may be used alone or in combination in place of the heat exchanger 103 in implementations. FIG. 4 illustrates a front perspective view of a heat exchanger 400 having a shape of a plate or box. Inlet gas can enter the opening 402 and exit the outlet opening 404. The major surface 406 of the heat exchanger 400 can be arranged to face the surfaces 121.

Figures 6, 7:
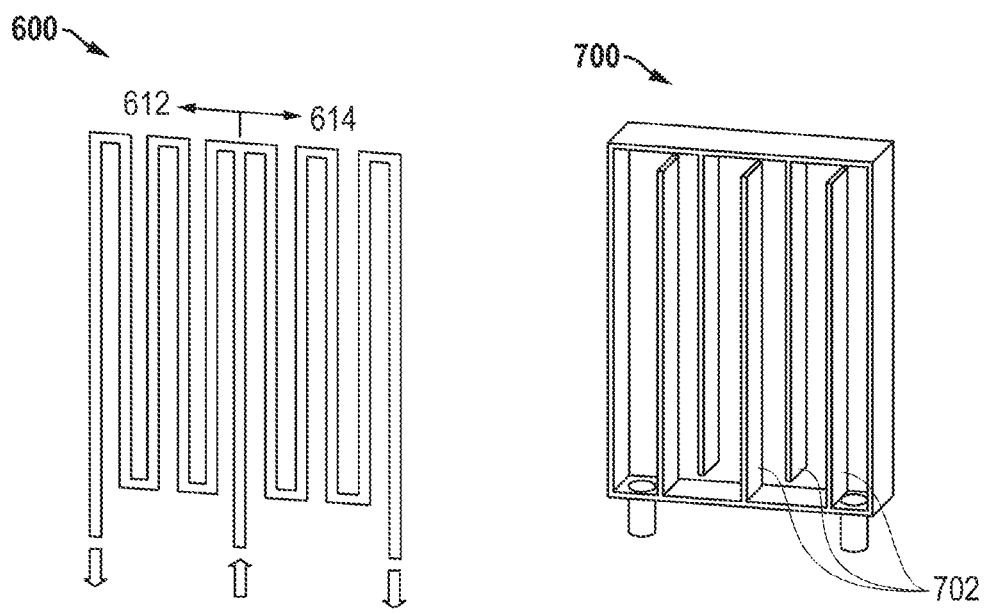

In FIG. 5, the heat exchanger 500 can include a single gas passage way extending in a serpentine shape, an inlet opening 502, and an outlet opening 504. In particular implementations, the inlet portion 520 can be directly faced with the hottest area of one of the electrochemical devices 121 and the outlet portion 510 may be faced with a cooler area of the electrochemical devices 102. FIG. 6 includes an illustration of another heat exchanger 600 having a serpentine shape including a first branch 612 and a second branch 614 extending in opposite directions. The heat exchanger 600 can be positioned in the similar manner as described in embodiments herein with respect to the heat exchanger 103.

Figure 8:
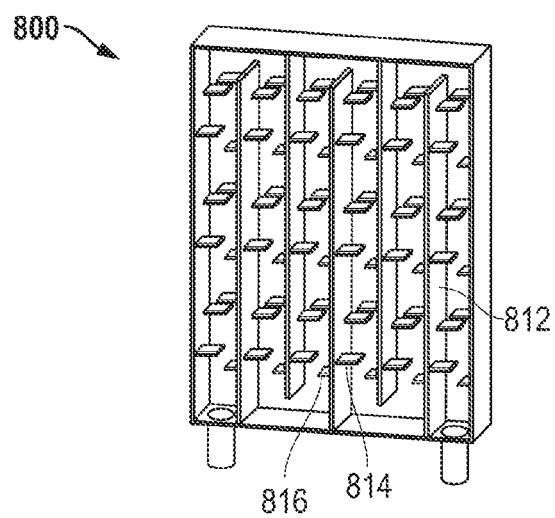

In an embodiment, any of the heat exchangers, such as 103, 400, 500, 600, 700, and 800 can include baffles, fins, or a combination thereof inside the heat exchanger. For instance, the heat exchanger 700 includes baffles 702, as illustrated in FIG. 7. FIG. 8 includes an illustration of the heat exchanger 800 including baffles 812, 814, and 816 that are arranged differently from the baffles 702.

Figure 9:
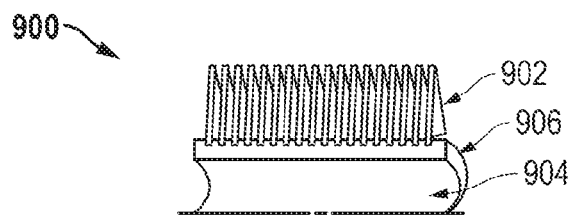
Figure 10:
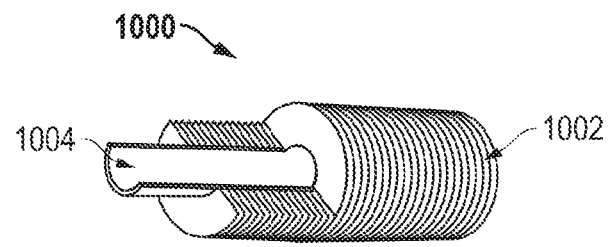

Portions of heat exchangers 900 and 1000 are illustrated in FIGS. 9 and 10, respectively. The heat exchanger can include fins 902 extending outward from the wall 906 defining a flow path 904. The fins 1002 are shaped differently than the fins 902 and extending from the wall of the heat exchanger 1000 defining a flow path 1004. A skilled artisan will appreciate fins and baffles having various forms and shapes can be suitable for the heat exchanger of embodiments herein.

In an embodiment, the heat exchanger can include a particular material that can facilitate improved heat transfer efficiency. In an aspect, the heat exchanger can include a material having a particular emissivity to help improve absorption of radiated heat energy. For instance, such material can have an emissivity of at least 0.90 or at least 0.95. As used herein, emissivity can be measured in accordance with ASTM E408-13. In another aspect, the heat exchanger can have a black outer surface. In a further aspect, the heat exchanger may be formed with a material having a relatively lower emissivity and coated with another material having the desired emissivity. In yet another aspect, the heat exchanger can include a heat-resistant, oxidation-resistant, or a corrosion-resistant material. For example, the heat exchanger can include an alumina scale-forming material, an interconnect material, or any combination thereof. An exemplary alumina scale-forming material can include a ferritic alloy, such as an iron-chromium-aluminum alloy (e.g., Kanthal APM™ and APMT™, Nisshin Steel NCA-1™), a nickel-chromium-aluminum-iron alloy (e.g., Haynes® 214®), or a high-carbon nickel-chromium-iron alloy (e.g., Nicrofer® 6025 HT-Alloy 602 CA). An exemplary interconnect material can include a metallic interconnect material, such as an iron-chromium alloy (e.g., Hitachi® ZMG232G10®, Crofer 22® APU), or a high temperature stainless steel (e.g., Crofer® 22H, Sanergy HT 441, E-Brite®). In a particular example, a coating material can be applied to the surface of the heat exchanger including a metallic interconnect material. The coating can include a glass material, an oxide, such as alumina and manganese cobalt oxide or the like, or any combination thereof. Another example of an interconnect material can include a ceramic material known in the art. In another instance, the heat exchanger can include an oxide, such as beryllium oxide, a carbide (e.g., SiC), a nitride, such as aluminum nitride. In yet another example, the heat exchanger can include a superalloy, such as a nickel-chromium based superalloy (e.g., Inconel® 600, 601, or 625), a nickel-based steel alloy (e.g., Hastalloy®), a nickel-based superalloy (e.g., Waspaloy®, Rene® 41, or Incoloy®), or any combination thereof.

In an embodiment, the apparatus can include at least 2, at least 3, at least 4, at least 5, at least 6, at least 7, at least 8, or at least 9 electrochemical devices. In an embodiment, the plurality of electrochemical devices may be arranged in a single row or a single column, as illustrated in FIG. 1. In another embodiment, the plurality of electrochemical devices may be arranged in rows and columns.

In a particular embodiment, the apparatus may include at least 4 electrochemical devices. In a particular example of an apparatus having 4 electrochemical devices, the first and second electrochemical devices may be positioned as electrochemical devices 102, as illustrated in FIG. 1, the third and further electrochemical devices may be positioned to form a 2×2 grid. The heat exchanger 103 can extend between the first and third electrochemical devices and between the second and further electrochemical devices. Particularly, the heat exchanger 103 can be faced with gas outlet surfaces of all the electrochemical devices. For instance, the heat exchanger 103 can be disposed between the oxidant-containing gas outlet surfaces of the first and third electrochemical devices and between the oxidant-containing gas outlet surfaces of the second and fourth electrochemical devices. In another instance, the heat exchanger 103 can be faced with all the fuel gas outlet surfaces of the electrochemical devices.

Figure 11:
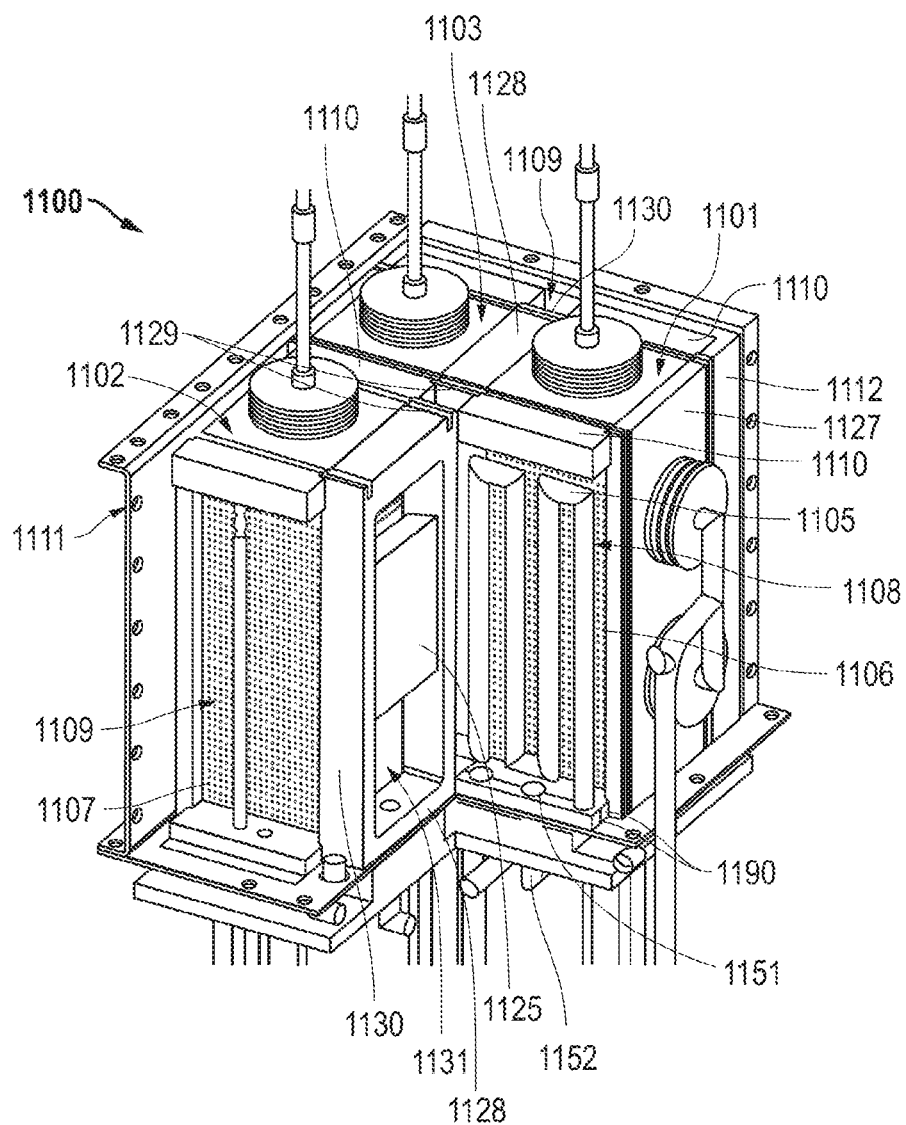
FIG. 11 includes an illustration of a perspective view of a portion of an apparatus according to an embodiment.

FIG. 11 includes an illustration of a portion of the apparatus 1100 including 4 electrochemical devices according to a particular embodiment. One of the electrochemical devices is not illustrated to further aid understanding of the structure of the apparatus 1100.

The apparatus 1100 can include a housing 1111 enclosing the electrochemical devices arranged in a grid. A skilled artisan will appreciate only a portion of the housing 1111 is illustrated in FIG. 11. The housing 1111 can be similar to the housing 101. The electrochemical devices can be positioned such that the oxidant-containing gas outlet surfaces of the electrochemical devices 1102 and 1103 are face-to-face and the oxidant-containing gas outlet surfaces of the electrochemical devices 1101 and 1104 (not depicted) are face-to-face.

The apparatus 1100 can include a central oxidant-containing outlet gas chamber 1108 that can be in fluid communication with each of electrochemical devices 1101 to 1104. As illustrated, the oxidant-containing outlet gas chamber 1108 can be positioned between the electrochemical devices 1102 and 1103 and between the electrochemical devices 1101 and 1104. The heat exchanger 1105 can be disposed within the oxidant-containing outlet gas chamber 1108.

In particular implementations, the oxidant-containing outlet gas chamber 1108 can be defined by the oxidant-containing gas outlet surfaces 1106, side walls 1129 of manifolds 1128, top structure components 1110, bottom structure components 1190, and the housing 1111. The structure components 1110 and 1190 can be in the form of metal or ceramic boxes or blocks. In particular embodiments, oxidant-containing outlet gas exiting oxidant-containing outlet surfaces 1106 can directly enter the oxidant-containing outlet gas chamber 1108. The oxidant-containing outlet gas chamber 1108 can be in fluid communication with at least one outlet gas pipe for transporting exhaust out of the chamber. As further illustrated in FIG. 11, the bottom structure component 1190 can have an opening 1151, and a gas outlet pipe 1152 can be connected to the bottom component 1190 at the opening 1151. Exhaust can exit the opening 1151 and be transported by the gas outlet pipe 1152.

As illustrated, the heat exchanger 1105 extends between the oxidant-containing gas outlet surfaces 1106 of the electrochemical devices 1101 to 1104. Accordingly, the heat exchanger 1105 is directly faced with 4 oxidant-containing gas outlet surfaces. The heat exchanger 1105 can have any of the features described in embodiments herein with respect to heat exchangers.

Figure 12:
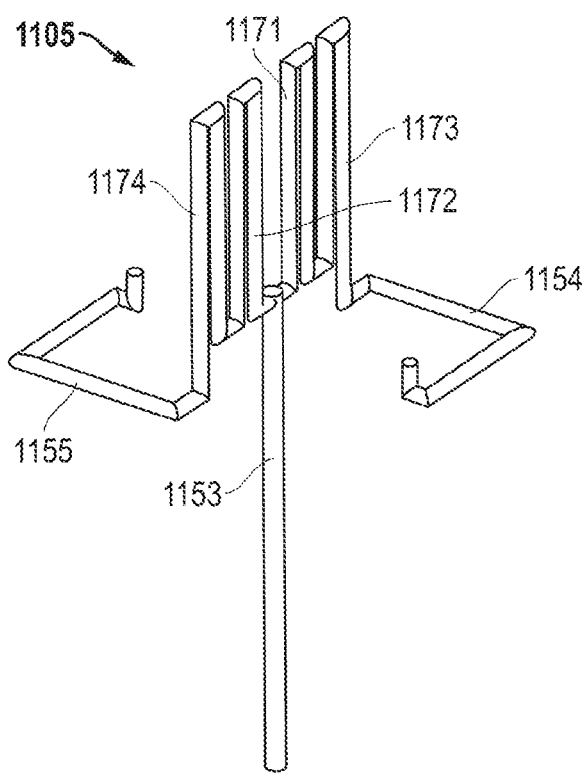
FIG. 12 includes an illustration of a perspective view of a heat exchanger according to another embodiment.

A particular embodiment of the heat exchanger 1105 is illustrated in FIG. 12. The heat exchanger 1105 can be connected to an inlet gas pipe 1153 that can be configured to transport cold oxidant-containing gas to the heat exchanger 1105. As used herein, the cold oxidant-containing gas is intended to refer to oxidant-containing inlet gas that has not been preheated to up to the temperature of electrochemical devices 1101 to 1104 before reaching the heat exchanger 1105. The inlet portions 1171 and 1172 can be adjacent and faced with hottest areas of the electrochemical devices 1102 and 1103 and 1101 and 1104, respectively. The outlet portions 1173 and 1174 can be connected to gas pipes 1154 and 1155, respectively, for transporting heated inlet gas to the electrochemical devices 1101 to 1104.

Referring to FIG. 11, the apparatus 1100 can include a first oxidant-containing gas inlet chamber 1109 in fluid communication with the electrochemical devices 1101 and 1103 and a second oxidant-containing gas inlet chamber 1109 in fluid communication with the electrochemical devices 1102 and 1104. The oxidant-containing gas inlet chamber 1109 can be defined by structure components 1110, oxidant-containing gas inlet surfaces 1107, side walls 1130 of the manifolds 1112, and the housing 1111.

In an embodiment, the gas pipe 1154 can be in fluid communication with the first oxidant-containing gas inlet chamber 1109. For instance, heated inlet gas can be transported by the gas pipe 1154 to the first oxidant-containing gas inlet chamber 1109, enter oxidant-containing gas channels via openings at the oxidant-containing inlet gas surfaces 1107, and be utilized by the electrochemical devices 1101 and 1103. Similarly, the gas pipe 1155 can be in fluid communication with the second oxidant-containing gas inlet chamber 1109, and heated inlet gas can be transported by the gas pipe 1155 to the second oxidant-containing gas inlet chamber 1109 and utilized by the electrochemical devices 1102 and 1104.

Figure 13:
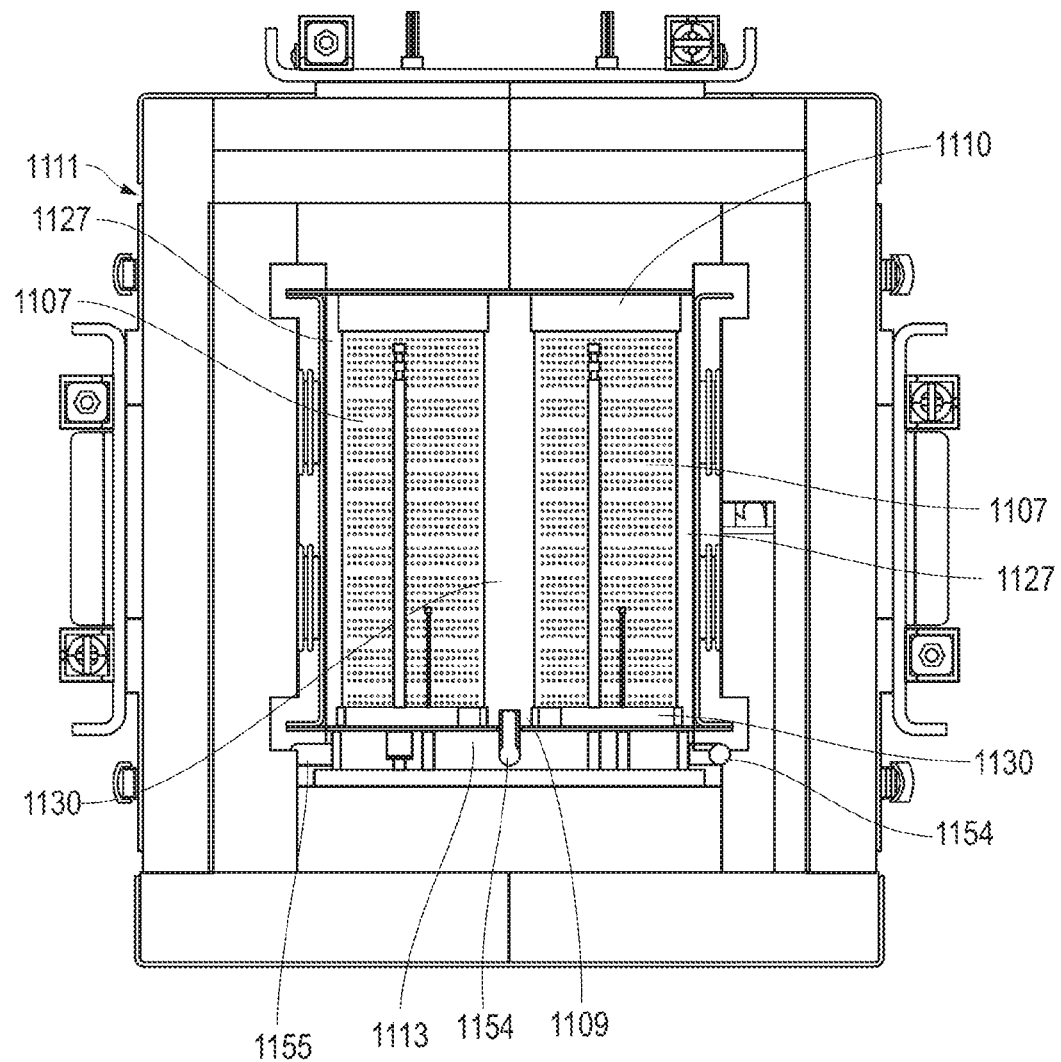
FIG. 13 includes an illustration of a cross-sectional view of an apparatus according to another embodiment.

Referring to FIG. 13, a cross section of the apparatus 1100 is illustrated. The oxidant-containing gas inlet surfaces 1107 can be open to the oxidant-containing gas inlet chamber 1109. The gas pipe 1154 (or 1155) can be connected to a bottom structure component 1113 for transportation of heated inlet gas to the oxidant-containing gas inlet chamber 1109. As illustrated, the gas pipe 1154 (or 1155) may pass through the bottom structure component 1113 and extend into the oxidant-containing gas inlet chamber 1109. In a particular implementation, only one gas pipe (e.g., 1154 or 1155) for transporting heated oxidant-containing inlet gas is connected to the inlet gas chamber 1109.

The central heat exchanger 1108 can be in fluid communication with both oxidant-containing gas inlet chambers 1109 via gas pipes 1154 and 1155. Further, the heat exchanger 1108 can be in fluid communication with each of the electrochemical devices 1101 to 1104.

Referring to FIG. 11, the apparatus 1100 can include a first manifold 1128 disposed between electrochemical devices 1102 and 1104. The first manifold 1128 can be attached to the two electrochemical devices. Particularly, the first manifold 1128 can be between fuel gas outlet surfaces of the electrochemical devices 1102 and 1104. The apparatus 1100 can further include a first fuel gas outlet chamber 1131 defined by the first manifold 1128 and fuel gas outlet surfaces of the electrochemical devices 1102 and 1104. Similarly, the apparatus 1100 can further include a second fuel gas outlet manifold 1128 and a second fuel gas outlet chamber 1131 between the fuel gas outlet surfaces of the electrochemical devices 1101 and 1103. The manifolds 1128 are the fuel gas outlet manifolds. As illustrated, the first and second fuel gas outlet chambers 1131 is separated by the central oxidant-containing gas outlet chamber 1108.

In a particular embodiment, a heat exchanger 1125 can be disposed within at least one of the fuel gas outlet chambers 1131. In more particular implementations, the apparatus 1100 can include a heat exchanger 1125 disposed within each of the fuel gas outlet chambers 1131. The heat exchanger 1125 can be configured to absorb heat generated by the electrochemical devices 1101 to 1104 and fuel outlet gas via radiation and convection. Further, the heat exchanger 1125 can be adapted to heat fuel inlet gas. In an embodiment, the heat exchanger 1125 can include any of the features described with respect to other heat exchangers.

Figure 14:
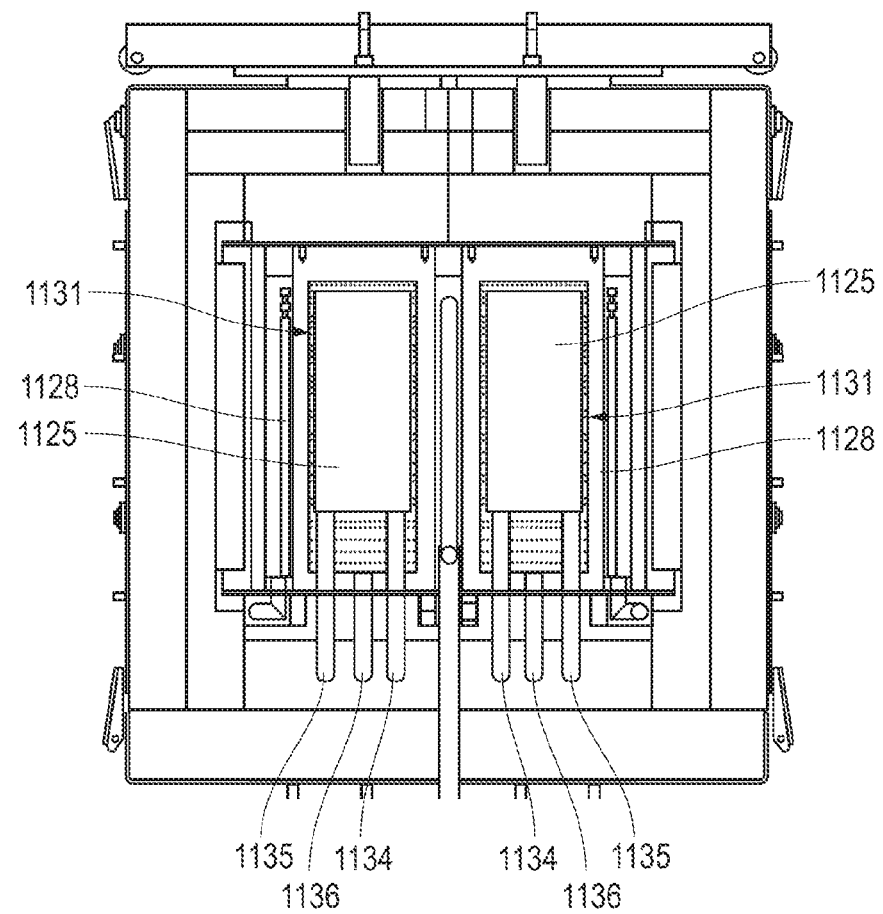
FIG. 14 includes an illustration of another cross-sectional view of an apparatus according to an embodiment.

In another embodiment, at least one of the heat exchangers 1125 can include a reformer, a vaporizer, or a combination thereof. Referring to FIG. 14, a cross section of the apparatus 1100 is illustrated. A heat exchanger 1125 is disposed within each of the fuel gas outlet chambers 1131 that are partially defined by the manifolds 1128. Each of the heat exchangers 1125 can include a reformer, be connected to a pipe 1134 that is adapted to transport cool fuel gas to the heat exchanger 1125 and connected to a pipe 1135 that is adapted to transport heated fuel inlet gas from the heat exchanger 1125.

In an example, cool fuel inlet gas can first enter the reformer, heated by the heat exchanger 1125, and exit the heat exchanger 1125 via the pipe 1135. In an embodiment, each of the pipes 1135 and heat exchangers 1125 can be in fluid communication with at least one of the electrochemical devices 1101 to 1104. In a particular instance, at least one of the heat exchangers 1125 can be in fluid communication with a plurality of electrochemical devices via one of the pipes 1135. In the illustrated embodiment, the heat exchangers 1125 disposed in the fuel outlet chamber between the electrochemical devices 1101 and 1103 can be in fluid communication with the electrochemical devices 1101 and 1103 and the other heat exchanger 1125 can be in fluid communication with the electrochemical devices 1102 and 1104.

Each fuel gas outlet chamber 1131 can be connected to a pipe 1136 that is adapted to transport fuel outlet gas. In a particular implementation, the pipes 1136 may be joined to form a main fuel outlet gas pipe.

Referring to FIG. 11, the apparatus 1100 can include a plurality of fuel inlet gas manifold. As illustrated in FIGS. 11 and 13, a fuel inlet gas manifold 1127 can be attached to each of the electrochemical devices 1101 to 1103. In an embodiment, the electrochemical device 1104 can be attached to a separate fuel inlet gas manifold 1127. The fuel gas inlet surface and the attached manifold 1127 of each electrochemical device can define a fuel gas inlet chamber. Each fuel gas inlet chamber can be in fluid communication with one of the heat exchangers 1125. As illustrated, fuel inlet gas manifold 1127 and outlet manifold 1128 are external to the electrochemical devices 1101 and 1104.

Figure 15:
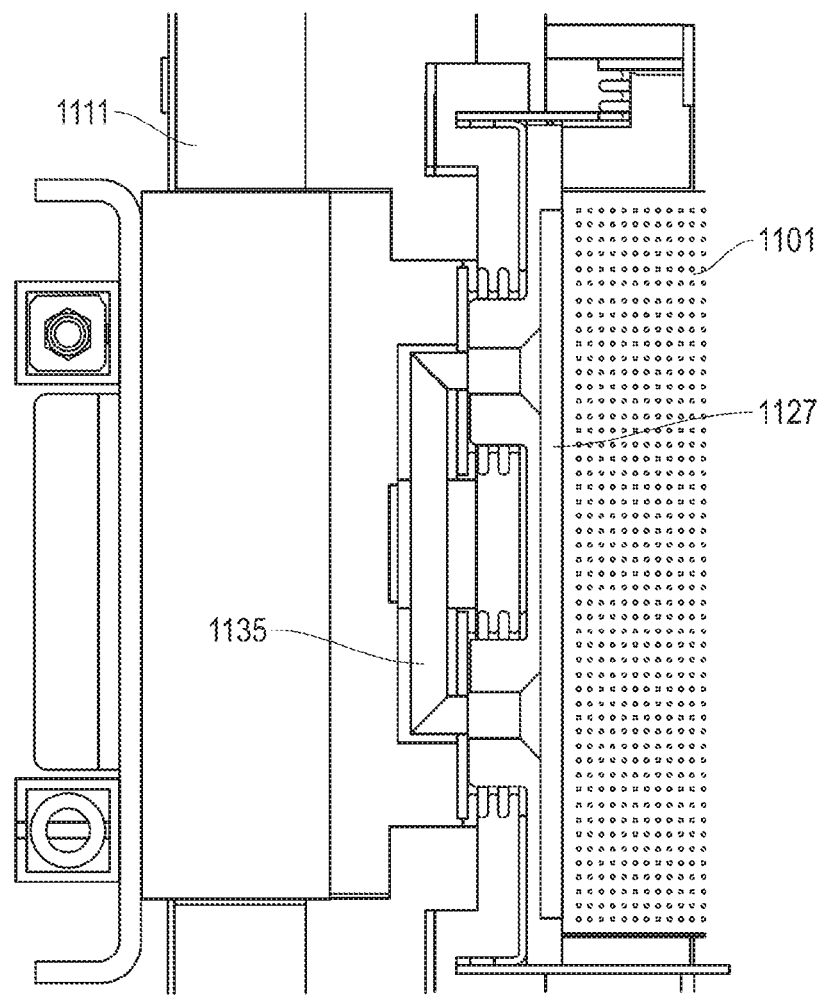
FIG. 15 includes an illustration of a cross-sectional view of a portion of an apparatus according to another embodiment.

FIG. 15 includes a cross-sectional illustration of a portion of the apparatus 1100 including a fuel gas inlet manifold 1127 attached to the fuel gas inlet surface of the electrochemical device 1101. A pipe 1135 can be connected to the manifold 1127 to provide heated fuel inlet gas to the electrochemical device 1101. Heated fuel inlet gas can enter the fuel gas inlet chamber and fuel gas channel openings at the fuel gas inlet surface and be utilized by the electrochemical device 1101. Fuel inlet gas distribution can be implemented in the similar manner for the electrochemical devices 1102 to 1104.

As illustrated, the apparatus 1100 may not include an oxidant-containing gas inlet or outlet manifold. A skilled artisan will appreciate an oxidant-containing gas inlet and/or outlet manifold can be implemented in the apparatus 1100, such as in a similar manner to the fuel gas inlet and/or outlet manifold.

Figure 16:
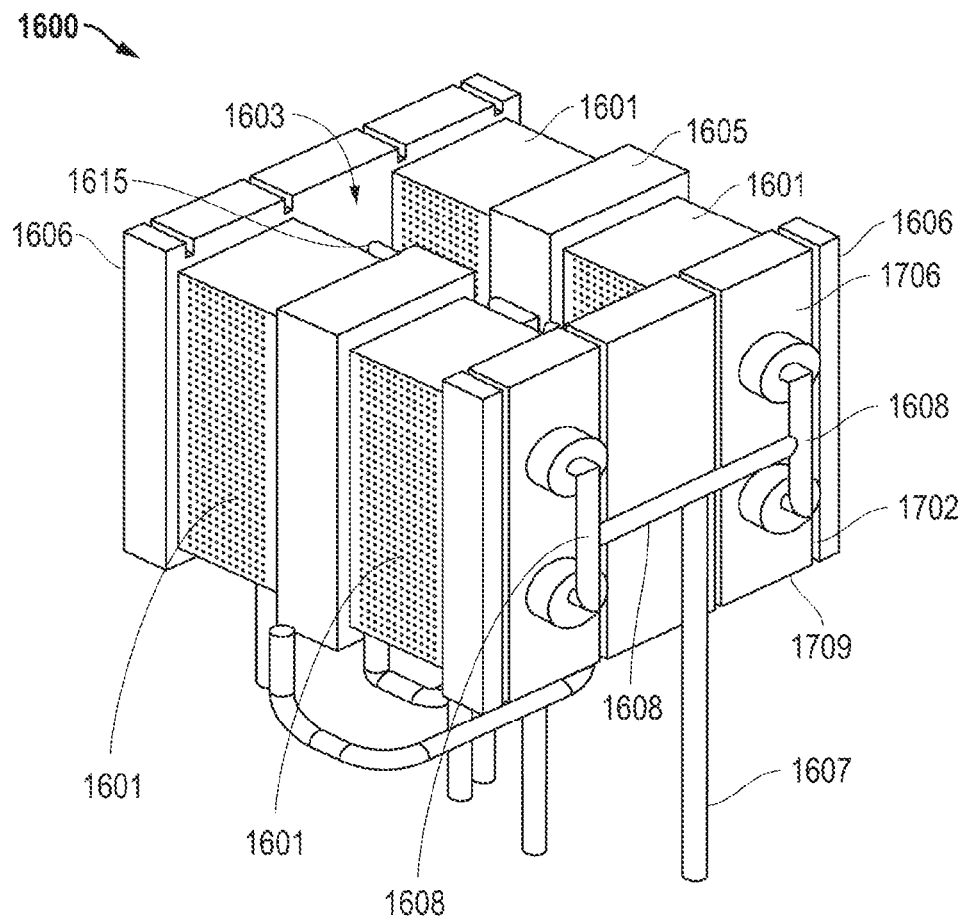
FIG. 16 includes an illustration of a perspective view of a portion of an apparatus according to still another embodiment.

FIG. 16 includes an illustration of a portion of an apparatus 1600 including 4 electrochemical devices 1601 arranged in a grid and a heat exchanger 1615 disposed within a central oxidant-containing gas outlet chamber 1603. The fuel outlet gas manifolds 1605 are each disposed between two of the electrochemical devices 1601. As illustrated, the apparatus 1600 is similar to the apparatus 1100, except that a fuel inlet gas manifold 1606 is attached to two of the electrochemical devices 1601.

As further illustrated, a pipe 1607 is connected to the piping system 1608 of the fuel inlet gas manifold 1606. The pipe 1607 can be adapted to transport heated fuel inlet gas and in fluid communication with a heat exchanger (not depicted) disposed within one of the fuel outlet gas manifold 1605. Heated fuel inlet gas can be distributed through the piping system 1608 to the electrochemical devices 1601.

Figure 17:
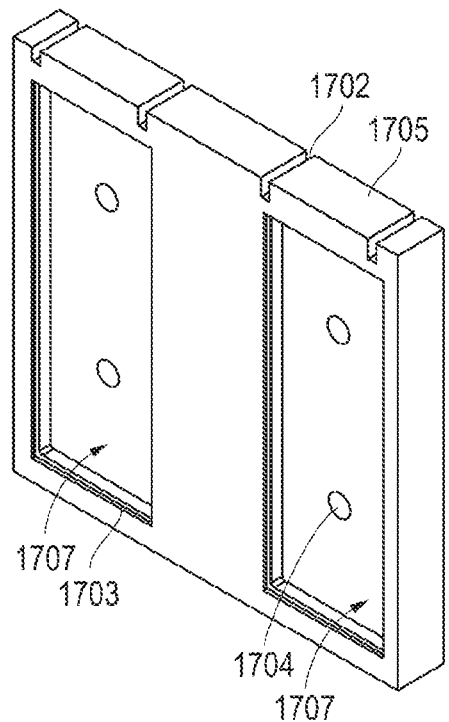
FIGS. 17 to 20 include illustrations of manifolds according to embodiments.

Referring to FIG. 17, a perspective view of the inside of the manifold 1606 of FIG. 16 is illustrated. The manifold can include a plurality of slits 1702 at the top surface 1705 of the manifold 1606. In some implementations, the slits 1702 can extend along the major outer surface 1706 (FIG. 16) to reach the bottom surface 1709 of the manifold 1606. The slits can help block gas flow from oxidant-containing gas inlet and/or outlet surfaces of the electrochemical devices 1601. The manifold 1606 can further include a lip 1703 to receive the electrochemical device 1601. An exemplary lip can include an indent. The lip 1703 can allow the electrochemical device 1601 to rest against the manifold 1606 providing additional sealing and stability. The holes 1704 can facilitate inlet gas distribution. In some instances, the manifold 1606 may include tubes in place of or in addition to the holes 1704. The manifold 1606 can further include chambers 1707 to facilitate inlet gas distribution. The chambers 1707 can form gas inlet chambers when the manifold is attached to electrochemical devices 1601.

Figure 18:
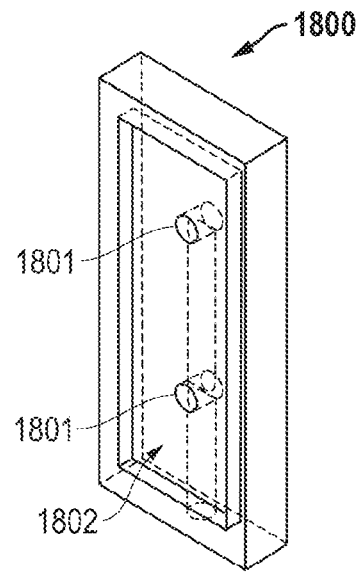

FIG. 18 includes an illustration of another manifold 1800 including a single chamber 1802 and tubes 1801 to facilitate inlet gas distribution. The manifold 1800 can also include slits 1702 and/or lip 1703. In an embodiment, the manifolds 1127 can include any of the features of the manifold 1800.

Figure 19:
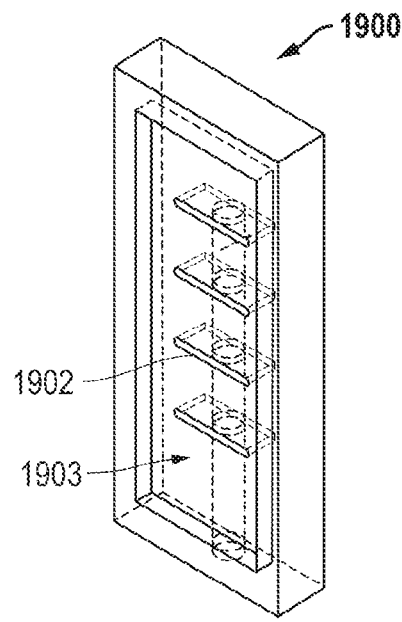

Alternatively, the manifold 1127 can be similar to the manifold 1900 illustrated in FIG. 19. A plurality of slots 1902 inside the chamber 1903 can facilitate even inlet gas distribution.

Figure 20:
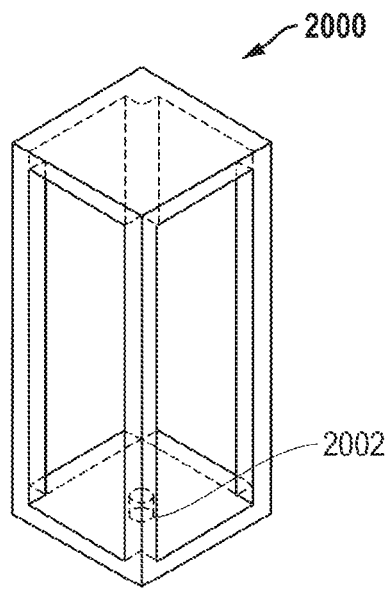

FIG. 20 includes an illustration of a manifold 2000 including an opening 2002 at the bottom to allow fluid to pass through. In some instances, the opening 2002 may be replaced by a tube. In an embodiment, the central fuel gas outlet manifold 1128 illustrated in FIG. 11 and/or 1605 illustrated in FIG. 16 can be similar to the manifold 2000.

In an embodiment, the manifold can include a refractory material, such as metal or ceramic material to facilitate inlet and outlet gas distribution.

Figure 21:
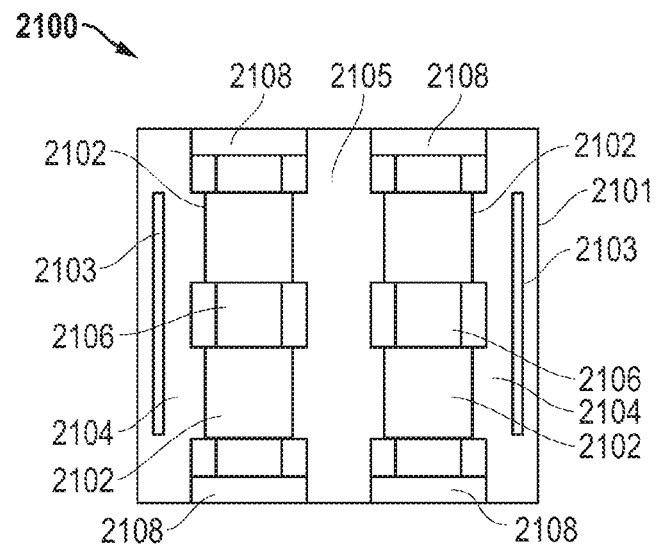
FIGS. 21 and 22 include an illustration of top views of apparatus according to embodiments.

FIGS. 21 to 24 include illustrations of examples of the apparatus according to embodiments herein. FIG. 21 illustrates an apparatus 2100 including a housing 2101 enclosing a plurality of electrochemical devices 2102 and a central oxidant-containing gas inlet chamber 2105 that is in fluid communication with each of the electrochemical devices 2102. The apparatus 2100 can further include a first heat exchanger 2103 disposed within a first oxidant-containing gas outlet chamber 2104 and a second heat exchanger 2103 positioned within the second oxidant-containing gas outlet chamber 2104. Each heat exchanger 2103 can be configured to heat oxidant-containing inlet gas, as described in embodiments with respect to heat exchangers 103 or 1105, and in fluid communication with the oxidant-containing gas inlet chamber 2105. Accordingly, each heat exchanger 2103 can be in fluid communication with at least one or at least two or all of the electrochemical devices 2102.

The apparatus 2100 can further include a plurality of fuel gas inlet manifolds 2106. Each manifold 2106 is disposed between and attached to the fuel gas inlet surfaces of two of the electrochemical devices 2102. The fuel gas outlet surface of each electrochemical device 2102 is attached to a fuel gas outlet manifold 2108. In an embodiment, at least one of the fuel gas outlet manifolds 2108 can enclose a heat exchanger, similar to the heat exchanger 1125, that is configured to heat fuel inlet gas and be in fluid communication with at least one or at least two of the electrochemical devices 2102. In an embodiment, at least one of fuel gas outlet manifolds 2108 can include a reformer, a vaporizer, or a combination thereof. As illustrated, the apparatus 2100 can include an arrangement including at least two electrochemical devices 2102 alternating with manifolds 2106 and 2108.

Figure 22:
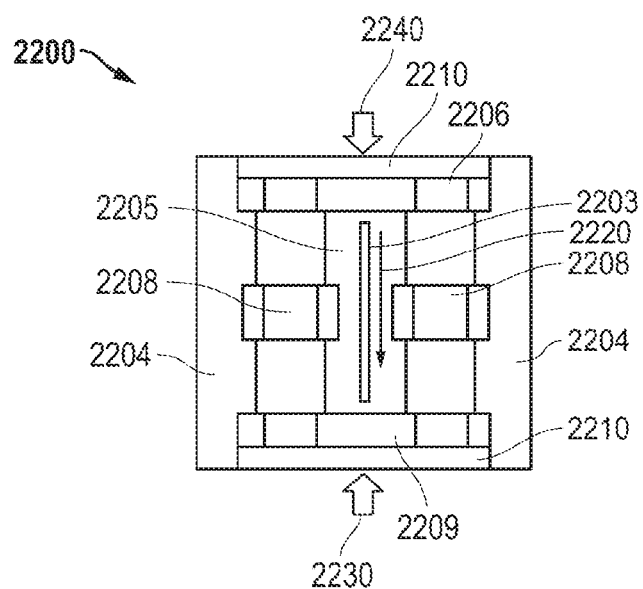

FIG. 22 includes an illustration of an apparatus 2200 including a central oxidant-containing gas outlet chamber 2205, a heat exchanger 2203 disposed within the oxidant-containing gas outlet chamber 2205, and a plurality of oxidant-containing gas inlet chambers 2204. The heat exchanger may include a single flow path in the direction 2220.

Figure 23:
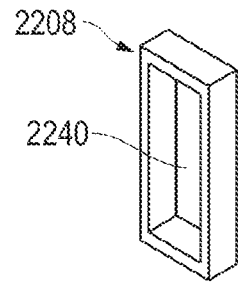
FIG. 23 includes an illustration of a manifold according to an embodiment.

The apparatus 2200 can include a fuel gas inlet manifold 2206 attached to the electrochemical devices S1 and S3. A first fuel gas outlet manifold 2208 can be disposed between the electrochemical devices S1 and S2, and a second fuel gas outlet manifold 2208 can be disposed between the electrochemical devices S3 and S4. In a particular embodiment, the first manifold 2208 can define a chamber that is fluid communication with the fuel gas outlet surface of the device S1 and with the fuel gas inlet surface of the device S2, and the second manifold 2208 can define a chamber that is fluid communication with the fuel gas outlet surface of the device S3 and with the fuel gas inlet surface of the device S4. Fuel outlet gas exiting the electrochemical device S1 can directly enter and serve as fuel inlet gas for the electrochemical device S2. Similarly, fuel outlet gas exiting the electrochemical device S3 can be directly utilized as fuel inlet gas for the electrochemical device S4. FIG. 23 includes an illustration of the fuel gas outlet manifold 2208 including a central opening 2240 to allow fuel outlet gas exiting electrochemical devices S1 and S3 to pass through. In a particular instance, the manifold 2208 can be in the shape of a frame.

The apparatus 2200 can further include fuel gas outlet manifold 2209 attached to fuel gas outlet surfaces of the electrochemical devices S2 and S4.

Figure 24:
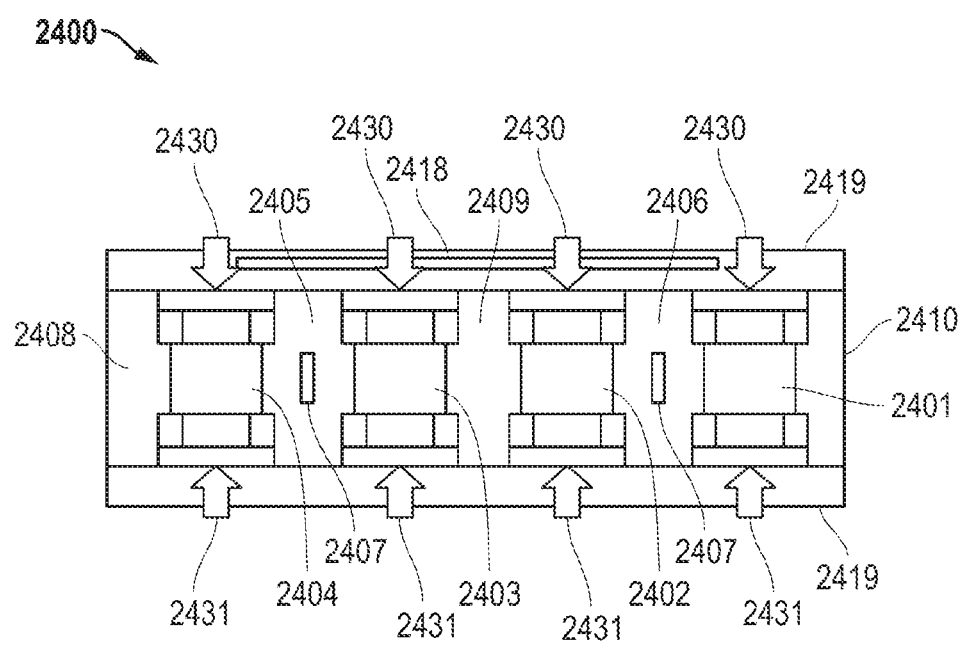
FIGS. 24 to 25 include illustrations of top views of apparatus according to embodiments.

FIG. 24 includes an illustration of an apparatus 2400 including a plurality of electrochemical devices 2401 to 2404 arranged in a row. The apparatus 2400 includes a plurality of oxidant-containing gas outlet chambers 2405 and 2406 alternating with a plurality of oxidant-containing gas inlet chambers 2408 to 2410. Particularly, the oxidant-containing gas outlet chambers 2405 and 2406 are disposed between electrochemical devices, such as between 2404 and 2403 and between 2402 and 2401, respectively. Heat exchangers 2407 are disposed within the oxidant-containing gas outlet chambers 2405 and 2406 and configured to heat oxidant-containing inlet gas. The first heat exchanger 2407 disposed between the devices 2403 and 2404 can be in fluid communication with the oxidant-containing gas inlet chambers 2408 and 2409 and with the devices 2402, 2403 and 2404. The second heat exchanger 2407 disposed between the devices 2402 and 2401 can be in fluid communication with the oxidant-containing gas inlet chambers 2409 and 2410 and with the devices 2401, 2402, and 2403. For instance, heated oxidant-containing inlet gas can be transported from the heat exchanger 2407 and to oxidant-containing inlet chambers 2408 and 2409 and utilized by the electrochemical devices 2404 and 2403. The heat exchanger 2407 can include any of the features described with respect to the heat exchanger 103 and/or 1105.

Each electrochemical device 2401 to 2404 is attached to an individual fuel gas outlet manifold at the fuel gas outlet surface and a fuel gas inlet manifold at the fuel gas inlet surface. Alternatively, a manifold that can accommodate two electrochemical devices can be utilized as an inlet and/or outlet manifold, such as the manifold illustrated in FIG. 17. The apparatus further includes a reformer 2418 disposed in the insulation 2419 disposed adjacent the fuel gas outlet manifolds. The fuel gas outlet manifolds can optionally enclose one or more heat exchangers that can be adapted to heat fuel inlet gas.

Figure 25:
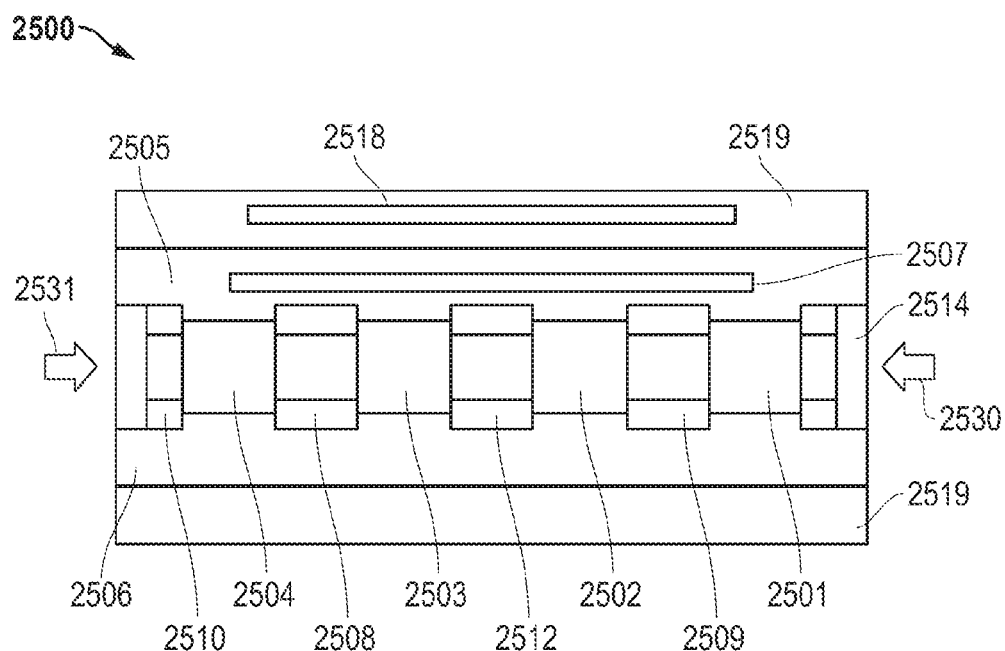

FIG. 25 includes an illustration of an apparatus 2500 including a plurality of electrochemical devices 2501 to 2504 arranged in a row, an oxidant-containing gas outlet chamber 2505 disposed at one side of the row, and an oxidant-containing gas inlet chamber 2506 disposed at the other side of the row. A heat exchanger 2507 similar to the heat exchanger 103 and/or 1105 is disposed within the oxidant-containing gas outlet chamber 2505. The heat exchanger 2507 can be configured to heat oxidant-containing inlet gas and in fluid communication with the oxidant-containing inlet chamber and with each of the electrochemical devices 2501 to 2504.

The apparatus 2500 further includes a reformer 2518 disposed in the insulation 2519 placed adjacent the oxidant-containing gas outlet chamber 2505.

Figure 26:
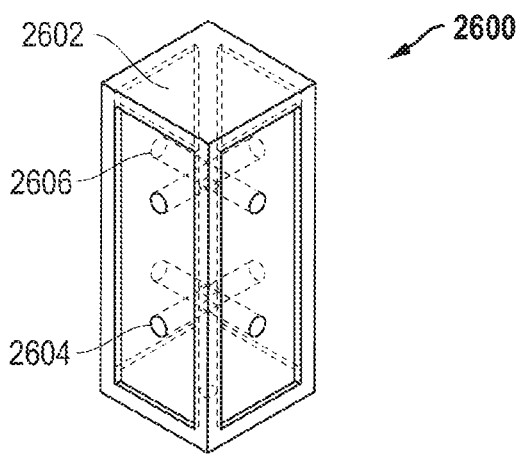
FIG. 26 includes an illustration of a manifold according to another embodiment.

The apparatus 2500 also includes a plurality of fuel gas inlet manifolds 2508 and 2509 and a plurality of fuel gas outlet manifolds 2510, 2512, and 2514 alternating with the fuel gas inlet manifolds 2508 and 2509. The fuel gas outlet manifold 2512 is deposed between electrochemical devices 2502 and 2503. In an embodiment, a heat exchanger similar to the heat exchanger 1125 can be disposed within the fuel gas outlet chamber contained by the manifold 2512 and in fluid communication with the fuel gas inlet manifolds 2508 and 2509. For instance, heated fuel inlet gas can be transported from the heat exchanger contained within the manifold 2512 to the piping system of inlet manifolds 2508 and 2509 and utilized by electrochemical devices 2501, 2502, 2503, and/or 2504. In an embodiment, the inlet manifolds 2508 and 2509 can be similar to the manifold 2600 illustrated in FIG. 26. The manifold 2600 can include a chamber 2602, openings 2604 and tubes 2606 for inlet gas distribution. In a further embodiment, the fuel gas outlet manifolds 2510 and 2514 may optionally enclose a heat exchanger similar to the heat exchanger 1125 that can be in fluid communication with the fuel gas inlet manifold 2508 and 2509, respectively.

Figure 27:
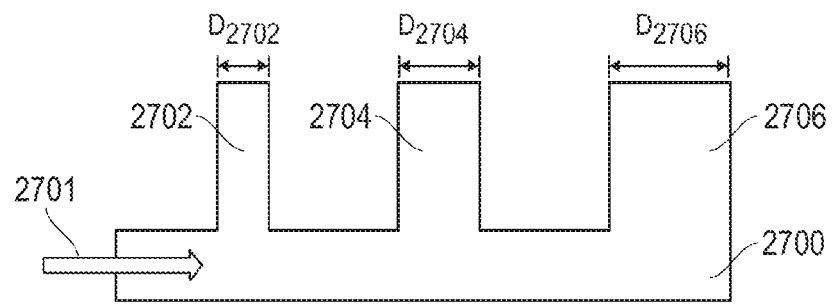
FIGS. 27 to 29 include illustrations of pipes according to embodiments.

In an embodiment, gas pipes may include features that can facilitate even inlet gas distribution. For instance, FIG. 27 includes an illustration of a pipe 2700 that may be suitable for transporting inlet gas to individual electrochemical devices. The pipe 2700 can include branches 2702, 2704, and 2706, extending away from the main flow path 2701. In an embodiment, the branches can extend toward the respective gas inlet surfaces of electrochemical devices. In an exemplary implementation, the pipe 2700 may be in fluid communication with the heat exchanger 2507 and configured to transport heated oxidant-containing inlet gas to electrochemical devices 2501 to 2504. In another instance, the pipe 2700 can be configured to transport fuel inlet gas to fuel inlet manifolds. As inlet gas reaches the branch 2702 first, increasing the diameter of the branch 2704 and further increasing the diameter of the branch 2706 can facilitate equal gas distribution by the branches 2702, 2704, and 2706. As illustrated, $D_{2702} < D_{2704} < D_{2706}$.

Figure 28:
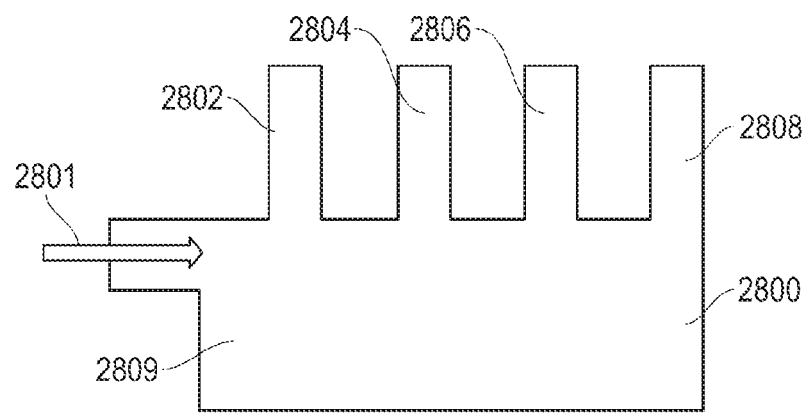

FIG. 28 includes an illustration of a pipe 2800 including branches 2802, 2804, 2806, and 2808, and a gas chamber 2809. The chamber 2809 can help decrease the velocity of the gas flow and thus, can facilitate even distribution of inlet gas by the branches.

Figure 29:
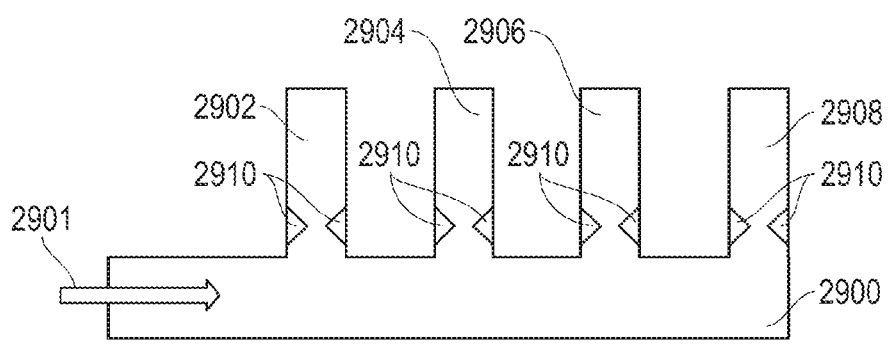

In FIG. 29, the pipe 2900 can include a flow path 2901 and branches 2902, 2904, 2906, and 2908. As illustrated, each branch can include a necking 2910 extending into the flow path of the branch. The necking can help control the flow through each pipe branch. In an embodiment, not all the branches have the necking 2910. For instance, the necking 2910 may be present in branches that are likely to have faster flow compared to others.

Figure 30:
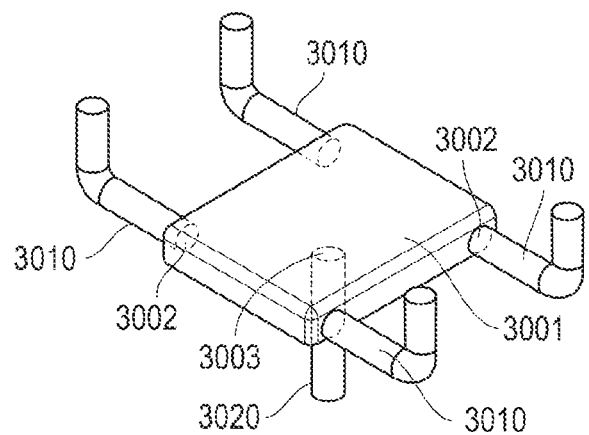
FIG. 30 includes an illustration of a pipe configuration according to an embodiment.
Figure 31:
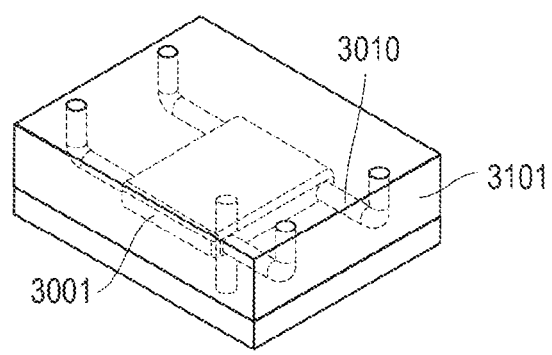
FIG. 31 includes an illustration of a pipe configuration according to another embodiment.

In embodiments, the gas chamber 2809 illustrated in FIG. 28 can take the form of the gas chamber 3001 illustrated in FIG. 30. The gas chamber 3001 has a central opening 3003 at the bottom of the chamber connected to the pipe 3020 through which an inlet gas can enter the chamber 3001. The chamber 3001 further includes a plurality of side openings 3002 connected to branches 3010 for transporting the inlet gas to electrochemical devices (not depicted). In a particular embodiment, as illustrated in FIG. 31, the chamber 3001 and at least a portion of each of the branches 3010 can be positioned within a bottom structure component 3101. In an embodiment, the bottom structure component 3101 can be similar to the component 1113 illustrated in FIG. 13. The branches 3010 can be connected to gas inlet chambers disclosed in embodiments herein, such as the gas inlet chamber 1109 illustrated in FIG. 11, and/or a gas inlet manifold, such as the fuel inlet manifold 1127 illustrated in FIG. 11. In an example, the branches 3010 may be connected to the bottom of an inlet gas chamber or manifold.

In an embodiment, components of the apparatus can be attached via compression. In an embodiment, compression can be exerted by a compression system external to the housing. In another embodiment, compression can be exerted via independent springs, a band, a cable, a ratchet, leaf springs, conical spring washers, clamps, weld, or any combination thereof. Referring to FIGS. 1, 13, 22, 24, and 25, compression can be applied to attach manifolds to the electrochemical devices. As illustrated in FIG. 21, the apparatus 2100 can include at least two electrochemical devices and at least 3 manifolds that are compressed in series. Referring to FIG. 22, a single compression system may be used to compress in the direction 2230 and 2240 the fuel outlet gas manifold 2209 and fuel inlet gas manifold 2210, respectively. As a result, the apparatus 2200 can include a plurality of the arrangements compressed in parallel. For instance, each arrangement can include manifolds alternating with electrochemical devices that are compressed in series. As illustrated in FIG. 25, the apparatus 2500 can include a single arrangement including alternating electrochemical devices and manifolds that are compressed in series by applying compression 2530 and 2531.

In an embodiment, compression can be transferred to the manifold, electrochemical devices, or a combination thereof via an insulation component. Referring to FIG. 24, individual compression 2430 and 2431 can be applied through insulation 2419 to fuel gas inlet and outlet manifolds attached to each electrochemical device. Further referring to FIG. 22, compression can be applied through the insulation components 2210 to the fuel inlet gas manifold 2206 and outlet gas manifold 2209. In an example, the insulation component can include metal, refractory material, or a combination thereof. In further embodiments, attachment of an electrochemical device to an inlet and/or outlet manifold may be facilities by a gasket placed there between.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiments

Embodiment 1. An apparatus, comprising:
a housing;
a plurality of electrochemical devices disposed within the housing; and
a heat exchanger disposed within the housing and faced with an oxidant-containing gas outlet surface of at least one of the plurality of electrochemical devices.

Embodiment 2. An apparatus, comprising:
a housing; and
a plurality of electrochemical devices disposed within the housing, wherein the plurality of electrochemical devices comprise a first and second electrochemical devices,
wherein one heat exchanger is disposed between the first and second electrochemical devices.

Embodiment 3. The apparatus of embodiment 2, wherein the heat exchanger is faced with a gas outlet surface of at least one of the first and second electrochemical devices.

Embodiment 4. The apparatus of any one of embodiments 2 to 3, wherein the heat exchanger is faced with an oxidant-containing gas outlet surface of at least one of the first and second electrochemical devices.

Embodiment 5. The apparatus of embodiment 1, wherein the plurality of electrochemical devices comprise a first and second electrochemical devices, and wherein the heat exchanger is faced with an oxidant-containing gas outlet surface of the first electrochemical devices and an oxidant-containing gas outlet surface of the second electrochemical device.

Embodiment 6. The apparatus of any one of embodiments 2 to 5, wherein the heat exchanger is disposed between an oxidant-containing gas outlet surface of the first electrochemical device and an oxidant-containing gas outlet surface of the second electrochemical device.

Embodiment 7. The apparatus of any one of embodiments 1 to 6, further comprising an oxidant-containing gas outlet chamber enclosed in the housing, wherein the oxidant-containing gas outlet chamber is in fluid communication with at least one of the first and second electrochemical devices, and wherein the heat exchanger is disposed within the oxidant-containing gas outlet chamber.

Embodiment 8. The apparatus of embodiment 7, wherein the oxidant-containing gas outlet chamber is in fluid communication with at least two of the plurality of electrochemical devices.

Embodiment 9. The apparatus of embodiment 7 or 8, wherein at least some of the plurality of electrochemical devices are arranged in a row, wherein the oxidant-containing gas outlet chamber is disposed on one side of the row and in fluid communication with an oxidant-containing gas outlet surface of each electrochemical device in the row.

Embodiment 10. The apparatus of embodiment 7 or 8, wherein the oxidant-containing gas outlet chamber is disposed between at least two of the plurality of electrochemical devices.

Embodiment 11. The apparatus of any one of embodiments 7 to 10, wherein the plurality of electrochemical devices are arranged in rows and columns, wherein the oxidant-containing gas outlet chamber is disposed between and in fluid communication with electrochemical devices in adjacent rows or in adjacent columns.

Embodiment 12. The apparatus of any one of embodiments 1 to 11, wherein the apparatus comprises:
a first electrochemical device, a second electrochemical device, a third electrochemical device, and a fourth electrochemical device arranged in a grid; and
a central oxidant-containing gas outlet chamber in fluid communication with each of the first, second, third, and fourth electrochemical devices.

Embodiment 13. The apparatus of embodiment 12, further comprising:
a first fuel gas outlet chamber disposed between and in fluid communication with the first and second electrochemical devices; and
a second fuel gas outlet chamber disposed between and in fluid communication with the third and fourth electrochemical devices,
wherein the first and second fuel gas outlet chamber is separated by the central oxidant-containing gas outlet chamber.

Embodiment 14. The apparatus of embodiment 12 or 13, further comprising:
a first oxidant-containing gas inlet chamber in fluid communication with the first and second electrochemical devices; and
a second oxidant-containing gas inlet chamber in fluid communication with the third and fourth electrochemical devices.

Embodiment 15. The apparatus of any one of embodiments 12 to 14, wherein the heat exchanger is disposed within the central oxidant-containing gas outlet chamber and faced with an oxidant-containing gas outlet surface of each of the first, second, third, and fourth electrochemical devices.

Embodiment 16. The apparatus of any one of embodiments 12 to 15, wherein the heat exchanger is disposed such that a gas inlet portion of the heat exchanger is adjacent to a surface portion of the oxidant-containing gas outlet surface has a higher temperature than the remainder of that surface for each of the first, second, third, and fourth electrochemical devices.

Embodiment 17. The apparatus of any one of embodiments 12 to 16, wherein the heat exchanger is disposed such that a gas inlet portion of the heat exchanger is closer to a corner defined by the oxidant-containing gas outlet surface and a fuel gas outlet surface than a corner defined by the oxidant-containing gas outlet surface and a fuel gas inlet surface of each of the first, second, third, and fourth electrochemical devices.

Embodiment 18. The apparatus of any one of embodiments 12 to 17, wherein the heat exchanger comprises a first branch and a second branch extending in different directions.

Embodiment 19. The apparatus of embodiment 18, wherein the first branch extends between the oxidant-containing gas outlet surfaces of the first and third electrochemical devices, wherein the first branch is coupled to one of the first oxidant-containing gas inlet chambers or the second oxidant-containing gas inlet chambers.

Embodiment 20. The apparatus of embodiment 18 or 19, wherein the second branch extends between the oxidant-containing gas outlet surfaces of the second and fourth electrochemical devices, wherein the second branch is coupled to the other one of the first oxidant-containing gas inlet or the second oxidant-containing gas inlet chambers.

Embodiment 21. The apparatus of any one of embodiments 14 to 20, wherein the heat exchanger is in fluid communication with the first and second oxidant-containing gas inlet chambers.

Embodiment 22. The apparatus of any one of embodiments 1 to 21, wherein the heat exchanger comprises a serpentine shape.

Embodiment 23. The apparatus of any one of embodiments 1 to 22, wherein the heat exchanger comprises a fin, a baffle, or a combination thereof.

Embodiment 24. The apparatus of any one of embodiments 1 to 23, wherein the heat exchanger comprises a material having an emissivity of at least 0.90 or at least 0.95.

Embodiment 25. The apparatus of any one of embodiments 13 to 24, further comprising a second heat exchanger disposed in the first fuel gas outlet chamber.

Embodiment 26. The apparatus of embodiment 25, further comprising a third heat exchanger disposed in the second fuel gas outlet chamber.

Embodiment 27. The apparatus of embodiment 25 or 26, wherein the second heat exchanger, the third heat exchanger, or both comprises a reformer, a vaporizer, or a combination thereof.

Embodiment 28. The apparatus of any one of embodiments 25 to 27, wherein the second heat exchanger is in fluid communication with at least one or at least two of the first, second, third, and fourth electrochemical devices.

Embodiment 29. The apparatus of any one of embodiments 25 to 28, wherein the third heat exchanger is in fluid communication with at least one or at least two of the first, second, third, and fourth electrochemical devices.

Embodiment 30. The apparatus of any one of embodiments 1 to 29, further comprising:
a first fuel gas inlet chamber in fluid communication with the first electrochemical device;
a second fuel gas inlet chamber in fluid communication with the second electrochemical device;
a third fuel gas inlet chamber in fluid communication with the third electrochemical device; and
a fourth fuel gas inlet chamber in fluid communication with the fourth electrochemical device.

Embodiment 31. The apparatus of embodiment 30, wherein the second heat exchanger is in fluid communication with two of the fuel gas inlet chambers and the third heat exchanger is in fluid communication with the other two of the gas inlet chambers.

Embodiment 32. The apparatus of any one of embodiments 1 to 31, further comprising:
a fuel gas inlet manifold attached to at least one electrochemical device;
a fuel gas outlet manifold attached to at least two electrochemical devices; or
any combination thereof.

Embodiment 33. The apparatus of any one of embodiments 30 to 32, wherein each fuel gas inlet chamber is contained by a fuel gas inlet manifold.

Embodiment 34. The apparatus of any one of embodiments 30 to 33, wherein each fuel gas outlet chamber is contained by a fuel gas outlet manifold.

Embodiment 35. The apparatus of any one of embodiments 32 to 34, wherein a reformer, a vaporizer, or a combination thereof is disposed within a wall of the fuel gas outlet manifold.

Embodiment 36. The apparatus of any one of embodiments 32 to 35, wherein a reformer, a vaporizer, or a combination thereof is disposed within insulation placed outside of the fuel gas outlet manifold.

Embodiment 37. The apparatus of any one of embodiments 25 to 36, wherein at least one of the second heat exchanger or the third heat exchanger comprises branches extending in different directions, wherein each branch is connected to a fuel inlet manifold.

Embodiment 38. The apparatus of any one of embodiments 25 to 37, further comprising a fuel gas inlet pipe connected to the second or the third heat exchanger and connected to a fuel gas inlet manifold, wherein the fuel gas inlet pipe is in fluid communication with the second or the third heat exchanger and with the fuel gas inlet chamber contained by the fuel gas inlet manifold.

Embodiment 39. The apparatus of any one of embodiments 1 to 38, further comprising an oxidant-containing gas inlet pipe connected to the heat exchanger and to the oxidant-containing gas inlet chamber, wherein the oxidant-containing gas inlet pipe is in fluid communication with the heat exchanger and the oxidant-containing gas inlet chamber.

Embodiment 40. The apparatus of any one of embodiments 25 to 39, further comprising a fuel gas outlet pipe connected to the fuel gas outlet manifold, wherein the fuel gas outlet pipe is in fluid communication with the fuel gas outlet chamber contained by the fuel gas outlet manifold.

Embodiment 41. The apparatus of any one of embodiments 25 to 40, further comprising an oxidant-containing gas outlet pipe connected to and in fluid communication with the oxidant-containing gas outlet chamber.

Embodiment 42. The apparatus of any one of embodiments 1 to 41, wherein the apparatus does not include an oxidant-containing gas inlet manifold or an oxidant-containing gas outlet manifold.

Embodiment 43. The apparatus of any one of embodiments 1 to 11, further comprising:
a first oxidant-containing gas outlet chamber disposed between the first and second electrochemical devices; and
a second oxidant-containing gas outlet chamber disposed between a third and fourth electrochemical devices,
wherein the first oxidant-containing gas outlet chamber is in fluid communication with oxidant-containing gas outlet surfaces of the first and second electrochemical devices; and
wherein the second oxidant-containing gas outlet chamber is in fluid communication with oxidant-containing gas outlet surfaces with the third and fourth electrochemical devices.

Embodiment 44. The apparatus of embodiment 43, wherein the first, second, third, and fourth electrochemical devices are disposed in one row.

Embodiment 45. The apparatus of embodiment 43 or 44, further comprising a fuel gas inlet chamber in fluid communication with at least one, at least two, or each one of the plurality of electrochemical devices.

Embodiment 46. The apparatus of any one of embodiments 1 to 11 and 43 to 45, further comprising a fuel gas outlet chamber opposite the fuel gas inlet chamber, wherein a heat exchanger is disposed within a wall of the housing adjacent the fuel gas outlet chamber, wherein the heat exchanger comprises a reformer, a vaporizer, or a combination thereof.

Embodiment 47. The apparatus of any one of embodiments 1 to 11 and 43 to 45, comprising a fuel gas outlet chamber disposed between at least two of the plurality of electrochemical devices.

Embodiment 48. The apparatus of any one of embodiments 1 to 11 and 43 to 45, comprising a fuel gas outlet chamber disposed between and in fluid communication with a fuel gas outlet surface of an electrochemical device and a fuel gas inlet surface of an adjacent electrochemical device.

Embodiment 49. The apparatus of any one of embodiments 1 to 11 and 43 to 48, further comprising:
an inlet gas pipe in fluid communication with at least two electrochemical devices;
an outlet gas pipe in fluid communication with at least two electrochemical devices; or
a combination thereof.

Embodiment 50. The apparatus of embodiment 49, further comprising a gas inlet pipe wherein the inlet gas pipe comprises a first and second branches extending toward the respective fuel gas inlet surfaces of the at least two electrochemical devices or toward the respective the oxidant-containing gas inlet surfaces of the at least two electrochemical devices, wherein the first and second branches comprise different diameters.

Embodiment 51. The apparatus of embodiment 49 or 50, wherein the inlet gas pipe comprises a first and second branches extending toward the respective fuel gas inlet surfaces of the at least two electrochemical devices or toward the respective the oxidant-containing gas inlet surfaces of the at least two electrochemical devices, wherein at least one of the first and second branches comprise a necking extending into the flow path.

Embodiment 52. The apparatus of any one of embodiments 49 to 51, wherein the inlet gas pipe comprises a chamber, wherein the first and second branches extend away from the chamber.

Embodiment 53. The apparatus of any one of embodiments 49 to 52, wherein the inlet gas pipe is an oxidant-containing gas inlet pipe connected to and in fluid communication with the heat exchanger and at least one oxidant-containing gas inlet chamber.

Embodiment 54. The apparatus of any one of embodiments 49 to 53, wherein the inlet gas pipe is a fuel gas inlet pipe connected to and in fluid communication with the second or third heat exchanger and at least one fuel gas inlet chamber.

Embodiment 55. The apparatus of any one of embodiments 49 to 54, further comprising a gas outlet pipe, wherein the gas outlet pipe is an oxidant-containing gas outlet pipe comprising first and second branches connected to the oxidant-containing gas outlet chamber.

Embodiment 56. The apparatus of any one of embodiments 49 to 55, wherein the gas outlet pipe is a fuel gas outlet pipe comprising first and second branches connected to the first and second fuel gas outlet chambers, respectively.

Embodiment 57. The apparatus of any one of embodiments 1 to 56, wherein the apparatus comprising:
an oxidant-containing gas inlet manifold attached to at least one electrochemical device, wherein
the oxidant-containing gas inlet chamber is part of the oxidant-containing gas inlet manifold;
an oxidant-containing gas outlet manifold attached to at least one electrochemical device,
wherein the oxidant-containing gas outlet chamber is part of the oxidant-containing gas outlet manifold;
a fuel gas inlet manifold attached to at least one electrochemical device, wherein the fuel gas inlet chamber is part of the fuel gas inlet manifold;
a fuel gas outlet manifold attached to at least one electrochemical device, wherein the fuel gas outlet chamber is part of the fuel gas outlet manifold; or
any combination thereof.

Embodiment 58. The apparatus of any one of embodiments 34 to 41 and 56, wherein at least one of the manifolds comprises a recess configured to receive at least one of the plurality of electrochemical devices.

Embodiment 59. The apparatus of any one of embodiments 56 to 58, wherein the inlet or outlet gas pipes are connected to the manifolds via welding, a glass-ceramic seal, or a combination thereof.

Embodiment 60. The apparatus of any one of embodiments 56 to 59, wherein:
the fuel gas outlet manifold comprises a metal;
the fuel gas inlet manifold comprises a ceramic material; or
a combination thereof.

Embodiment 61. The apparatus of any one of embodiments 56 to 60, wherein:
the oxidant-containing gas outlet manifold comprises a metal;
the oxidant-containing gas inlet manifold comprises a ceramic material; or
a combination thereof.

Embodiment 62. The apparatus of any one of embodiments 56 to 61, wherein the manifolds are attached to the plurality of electrochemical devices via compression.

Embodiment 63. The apparatus of embodiment 1 or 2, wherein apparatus comprises an arrangement including at least two electrochemical devices alternating with manifolds.

Embodiment 64. The apparatus of embodiment 63, wherein the at least two electrochemical devices and at least 3 manifolds are compressed in series.

Embodiment 65. The apparatus of embodiment 63 or 64, wherein the apparatus comprises a plurality of the arrangements compressed in parallel by a single compression system.

Embodiment 66. The apparatus of any one of embodiments 62 to 65, wherein the compression is exerted via independent springs, a band, a cable, a ratchet, leaf springs, conical spring washers, clamps, weld, or any combination thereof.

Embodiment 67. The apparatus of any one of embodiments 62 to 66, wherein the compression is exerted by a compression system external to the housing, wherein the compression is transferred to the manifold, electrochemical devices, or a combination thereof via an insulation component.

Embodiment 68. The apparatus of any one of embodiments 62 to 67, further comprising a gasket placed between an electrochemical device and at least one of the manifolds.

Embodiment 69. The apparatus of any one of embodiments 1 to 68, wherein the electrochemical device comprises a stack of solid oxide fuel cells, a battery, or a solid oxide electrolyzer cell.

Embodiment 70. The apparatus of any one of embodiments 1 to 69, wherein the electrochemical device comprises a stack of solid oxide fuel cells and the stack of solid oxide fuel cells has a cross-flow configuration.

Embodiment 71. The apparatus of embodiment 70, wherein the stack of solid oxide fuel cells consists essentially of ceramic materials.

Embodiment 72. The apparatus of any one of embodiments 35 to 71, wherein the manifolds are external to the electrochemical devices.

Embodiment 73. An apparatus, comprising:
a housing; and
a plurality of electrochemical devices disposed within the housing, wherein the plurality of electrochemical devices comprise a first and second electrochemical devices, and
a first gas outlet chamber within the housing, wherein the gas outlet chamber is between and in fluid communication with the first and second electrochemical devices.

Embodiment 74. The apparatus of embodiment 73, further comprising a first heat exchanger disposed within the gas outlet chamber.

Embodiment 75. The apparatus of any one of embodiments 1 to 74, wherein the plurality of electrochemical devices comprise at least 2, at least 4, at least 6, at least 8, or at least 9 electrochemical devices.

Embodiment 76. The apparatus of any one of embodiments 1 to 75, wherein at least one of the electrochemical devices comprises a first gas channel extending between a second surface and the first surface of the electrochemical device, the second surface being opposite the first surface, wherein the first gas channel comprises a gas outflow end at the first surface, the gas outflow end facing the heat exchanger.

Embodiment 77. The apparatus of embodiment 76, wherein the heat exchanger is positioned such that a major surface of the heat exchanger faces the first surface.

Embodiment 78. The apparatus of embodiments 76 or 77, wherein the heat exchanger includes a surface area that is directly exposed to the first surface, wherein the surface area is at least 25%, at least 40%, at least 60%, or at least 75% of a total area of the first surface.

Embodiment 79. The apparatus of any one of embodiments 77 to 78, wherein the heat exchanger and the electrochemical device are arranged such that an outlet gas passing through the first surface passes across or impinges upon the heat exchanger.

Embodiment 80. The apparatus of any one of embodiments 1 to 79, wherein the heat exchanger is configured to receive and heat an inlet gas that has a temperature lower than a temperature of the at least one of the plurality of electrochemical devices.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An apparatus, comprising:
a housing;
a plurality of electrochemical devices disposed within the housing; and
a heat exchanger disposed within the housing and faced with an oxidant-containing gas outlet surface of at least one of the plurality of electrochemical devices without an intermediate component between the heat exchanger and the oxidant-containing gas outlet surface.

2. The apparatus of claim 1, wherein the plurality of electrochemical devices comprise a first and second electrochemical device, and wherein the heat exchanger is faced with an oxidant-containing gas outlet surface of the first electrochemical device and an oxidant-containing gas outlet surface of the second electrochemical device.

3. The apparatus of claim 2, further comprising an oxidant-containing gas outlet chamber enclosed in the housing, wherein the oxidant-containing gas outlet chamber is in fluid communication with the first and second electrochemical devices, and wherein the heat exchanger is disposed within the oxidant-containing gas outlet chamber.

4. The apparatus of claim 3, wherein the oxidant-containing gas outlet chamber is disposed on one side of the first and second electrochemical devices.

5. The apparatus of claim 3, wherein the oxidant-containing gas outlet chamber is disposed between the first and second electrochemical devices.

6. The apparatus of claim 3, wherein the plurality of electrochemical devices are arranged in a grid, and wherein the oxidant-containing gas outlet chamber is a central oxidant-containing gas outlet chamber in fluid communication with at least 4 electrochemical devices including the first and second electrochemical devices.

7. The apparatus of claim 3, further comprising:
a fuel gas outlet chamber disposed between and in fluid communication with the first and second electrochemical device.

8. The apparatus of claim 3, further comprising:
an oxidant-containing gas inlet chamber in fluid communication with the first and second electrochemical devices.

9. The apparatus of claim 3, wherein the heat exchanger comprises a first branch and a second branch extending in opposite directions, wherein the first branch is coupled to a first oxidant-containing gas inlet chamber in fluid communication with the first electrochemical device, and the second branch is coupled to a second oxidant-containing gas inlet chamber in fluid communication with the second electrochemical device.

10. The apparatus of claim 7, wherein the heat exchanger is the first heat exchanger, and wherein the apparatus further comprises a second heat exchanger disposed in the fuel gas outlet chamber.

11. The apparatus of claim 10, wherein the heat exchanger disposed in the fuel gas outlet chamber is coupled to a fuel gas inlet chamber in fluid communication with at least one of the first and second electrochemical devices.

12. The apparatus of claim 1, wherein the heat exchanger comprises a reformer, a vaporizer, or a combination thereof.

13. The apparatus of claim 1, further comprising:
a fuel gas inlet manifold attached to at least one of the plurality of electrochemical devices, wherein the fuel gas inlet manifold contains a fuel gas inlet chamber in fluid communication with the at least one electrochemical device;
a fuel gas outlet manifold attached to at least one of the plurality of electrochemical devices, wherein the fuel gas outlet manifold contains a fuel gas outlet chamber in fluid communication with the at least one electrochemical device; or
a combination thereof.

14. The apparatus of claim 13, wherein at least one of the fuel gas inlet and outlet manifolds comprises a recess configured to receive the at least one of the plurality of electrochemical devices.

15. The apparatus of claim 13, wherein the fuel gas inlet manifold and the fuel gas outlet manifold are attached via compression.

16. The apparatus of claim 13, wherein the fuel gas inlet manifold and the fuel gas outlet manifold are external to the plurality of electrochemical devices.

17. An apparatus, comprising:
a housing:
a plurality of electrochemical devices disposed within the housing;
a heat exchanger disposed within the housing and faced with an oxidant-containing gas outlet surface of at least one or more of the plurality of electrochemical devices;
a first oxidant-containing gas outlet chamber disposed between a first electrochemical device and a second electrochemical device of the plurality of electrochemical devices; and
a second oxidant-containing gas outlet chamber disposed between a third electrochemical device and a fourth electrochemical device of the plurality of electrochemical devices,
wherein the heat exchanger is disposed within one of the first and second oxidant-containing gas outlet chambers;
wherein the first oxidant-containing gas outlet chamber is in fluid communication with oxidant-containing gas outlet surfaces of the first and second electrochemical devices; and
wherein the second oxidant-containing gas outlet chamber is in fluid communication with oxidant-containing gas outlet surfaces with the third and fourth electrochemical devices.

18. The apparatus of claim 1, wherein the electrochemical device comprises a stack of solid oxide fuel cells, a battery, or a solid oxide electrolyzer cell.

19. The apparatus of claim 1, wherein the heat exchanger includes a surface area that is directly exposed to the oxygen-containing gas outlet surface, wherein the surface area is at least 25% of a total area of the oxygen-containing gas outlet surface.

20. The apparatus of claim 1, wherein the at least one of the plurality of electrochemical devices comprises at least one gas channel extending between the oxygen-containing gas outlet surface and an opposite oxygen-containing gas inlet surface, wherein the heat exchanger is exposed to a gas outflow end of the at least one gas channel.

* * * * *

UNITED STATES PATENT AND TRADEMARK OFFICE
CERTIFICATE OF CORRECTION

Page 1 of 1

PATENT NO. : 11,557,775 B2
APPLICATION NO. : 17/127387
DATED : January 17, 2023
INVENTOR(S) : Claire Loe et al.

It is certified that error appears in the above-identified patent and that said Letters Patent is hereby corrected as shown below:

In the Claims

In Column 23, Line 2, please delete "a housing:", and insert --a housing;--

In Column 23, Line 6-7, please delete "at least one or more of the", and insert --at least one of the--

Signed and Sealed this
Twenty-fifth Day of June, 2024

Katherine Kelly Vidal
*Director of the United States Patent and Trademark Office*